US012579238B2

(12) United States Patent
Aoyagi et al.

(10) Patent No.: US 12,579,238 B2
(45) Date of Patent: Mar. 17, 2026

(54) AUTHENTICATION PROCESSING APPARATUS, AUTHENTICATION PROCESSING METHOD, AND NON-TRANSITORY COMPUTER-READABLE STORAGE MEDIUM

(71) Applicant: NEC Corporation, Tokyo (JP)

(72) Inventors: Toru Aoyagi, Tokyo (JP); Yoshiko Imanishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 18/032,257

(22) PCT Filed: Oct. 27, 2020

(86) PCT No.: PCT/JP2020/040272
§ 371 (c)(1),
(2) Date: Apr. 17, 2023

(87) PCT Pub. No.: WO2022/091221
PCT Pub. Date: May 5, 2022

(65) Prior Publication Data
US 2023/0394179 A1 Dec. 7, 2023

(51) Int. Cl.
*G06F 21/32* (2013.01)
*G06F 21/31* (2013.01)
*G06F 21/64* (2013.01)

(52) U.S. Cl.
CPC .............. *G06F 21/32* (2013.01); *G06F 21/31* (2013.01); *G06F 21/64* (2013.01)

(58) Field of Classification Search
CPC .......... G06F 21/32; G06F 21/31; G06F 21/64; G06F 21/34
See application file for complete search history.

(56) References Cited

U.S. PATENT DOCUMENTS 10,706,266 B2 * 7/2020 Norimatsu ........... G06V 40/172
11,068,575 B2 * 7/2021 Spencer, III .......... H04W 12/06
(Continued)

FOREIGN PATENT DOCUMENTS

JP 2001-202336 A 7/2001
JP 2001-265738 A 9/2001
(Continued)

OTHER PUBLICATIONS

International Search Report for PCT Application No. PCT/JP2020/040272, mailed on Jan. 26, 2021.

*Primary Examiner* — Chau Le
(74) *Attorney, Agent, or Firm* — Sughrue Mion, PLLC

(57) ABSTRACT

An information processing apparatus (100) includes: an acquisition unit (102) that acquires first personal identifiable information and terminal identifiable information from a storage medium of a portable type that stores the first personal identifiable information and the terminal identifiable information; an authentication unit (104) that authenticates second personal identifiable information acquired by a sensor mounted on a terminal and the terminal identifiable information of the terminal by using the first personal identifiable information and the terminal identifiable information being acquired from the storage medium; and an execution unit (106) that executes predetermined processing when the authentication succeeds.

15 Claims, 22 Drawing Sheets

(56)      References Cited

U.S. PATENT DOCUMENTS

| 2013/0111570 A1* | 5/2013 | Kaariainen | ........... H04L 63/126 |
| | | | 726/5 |
| 2013/0301886 A1* | 11/2013 | Koda | ...................... G06F 21/32 |
| | | | 382/118 |
| 2019/0158702 A1* | 5/2019 | Shirakawa | ......... H04N 1/00384 |
| 2020/0413007 A1* | 12/2020 | Horio | ........................ G06T 7/80 |

FOREIGN PATENT DOCUMENTS

| JP | 2007-080006 A | 3/2007 |
| JP | 2009-071629 A | 4/2009 |
| JP | 2015-045983 A | 3/2015 |
| JP | 2019-096938 A | 6/2019 |
| JP | 2020-087461 A | 6/2020 |

\* cited by examiner

FIG. 2

<WHEN IC CARD IS USED>

FIG. 9

<P1: APPLY FOR ISSUANCE OF ELECTRONIC CERTIFICATE REGISTER AS USER >

FIG. 10A
P1
(S103)    20
| USER ID |
| PASSWORD |
FIG. 10B
P1
(S111)    20
| USER ID |
| PASSWORD |
| PUBLIC KEY |
FIG. 10C
P3    20
| USER ID |
| PASSWORD |
| PUBLIC KEY |
| TERMINAL ID |
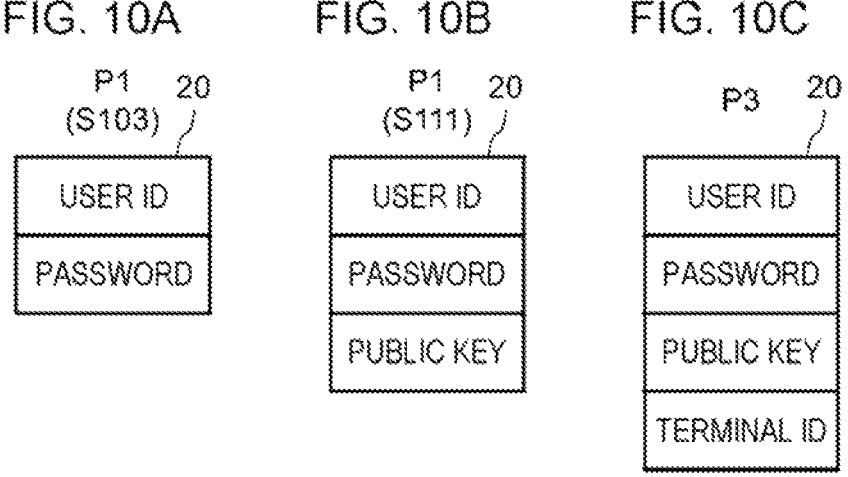
FIG. 10D
P3    20
| APPLICATION ID (VERSION) |
| PUBLIC KEY FOR CHALLENGE |
| ACQUISITION DATE AND TIME |
FIG. 10E
P27
(S407)    20
| USER ID |
| PASSWORD |
| PUBLIC KEY |
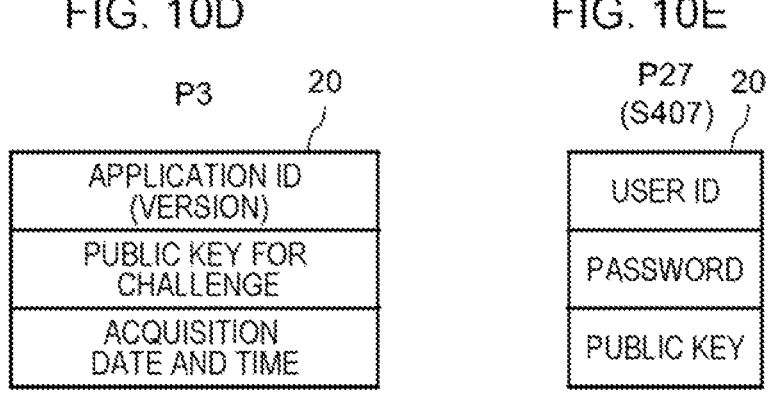

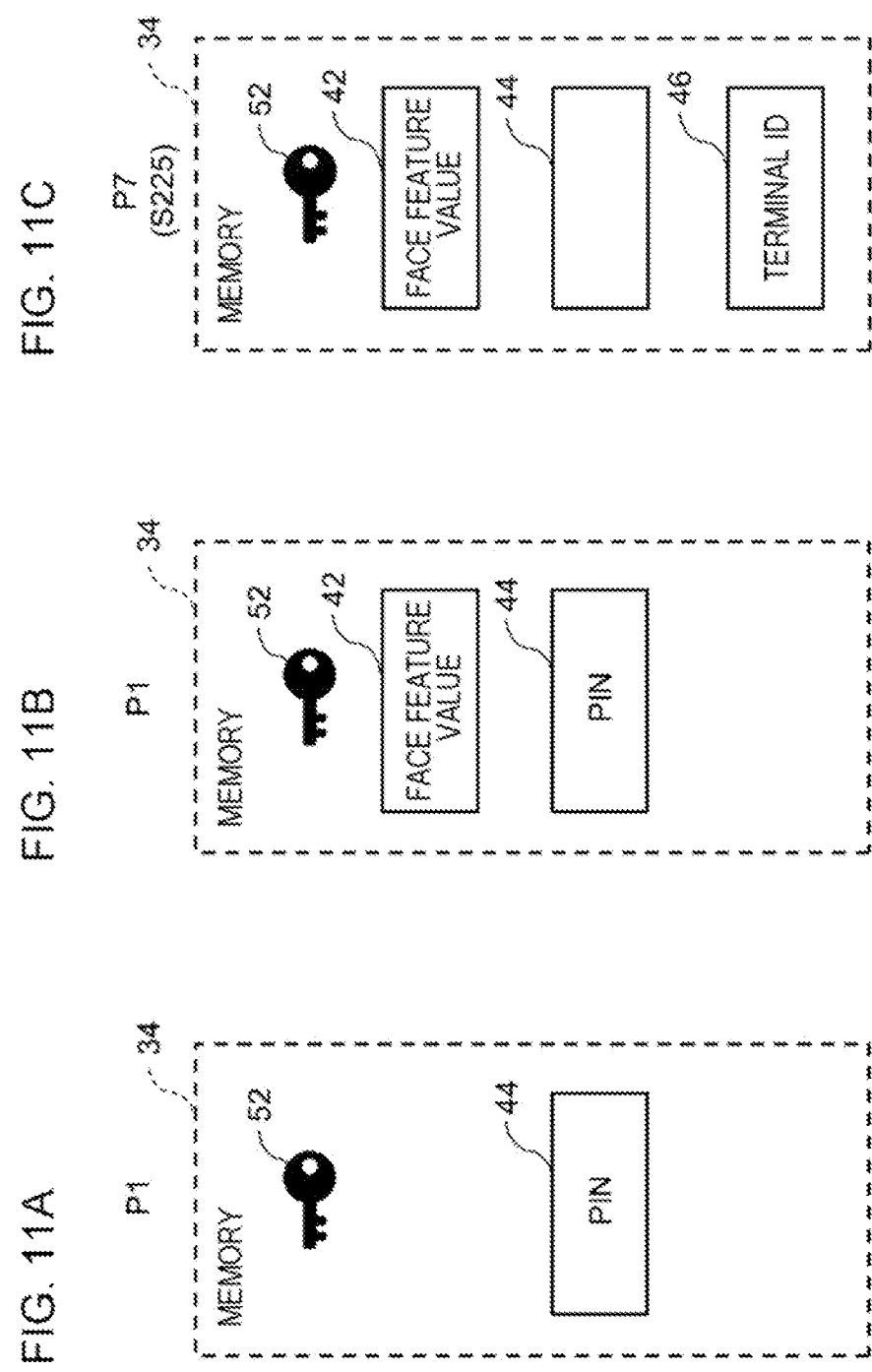

<P5: RECORD IDENTITY VERIFICATION INFORMATION
ON IC CARD: eKYC>

<P7: INITIAL REGISTRATION PROCEDURE (REGISTER TERMINAL)>

<P11: ELECTRONIC SIGNATURE PROCEDURE>

<WHEN NON-IC CARD (FRONT) IS USED>

<P27: INITIAL REGISTRATION PROCEDURE (REGISTER TERMINAL)>

<LOGIN PROCESSING TO PORTAL SITE>

AUTHENTICATION PROCESSING APPARATUS, AUTHENTICATION PROCESSING METHOD, AND NON-TRANSITORY COMPUTER-READABLE STORAGE MEDIUM

This application is a National Stage Entry of PCT/JP2020/040272 filed on Oct. 27, 2020, the contents of all of which are incorporated herein by reference, in their entirety.

TECHNICAL FIELD

The present invention relates to an information processing apparatus, an information processing method, and a program, and particularly relates to an information processing apparatus, an information processing method, and a program related to an electronic procedure.

BACKGROUND ART

In recent years, digitization of a document has been getting into full swing. In a document, an electronic signature is used for proving identity and proving non-tampering. In preparation for a possibility that a key is stolen at the worst, generation of an electronic signature based on face authentication as described in Patent Document 1 has been known.

Further, Patent Document 2 describes a personal identification system for acquiring a personal identification image by a user capturing his/her personal identification document by a camera of a portable terminal, storing the acquired personal identification image as a comparison image in the portable terminal, acquiring a face image of a user by a camera at a time of service use, transmitting a result of comparison with a comparison layer to a personal authentication server, and permitting the person the service use by the personal authentication server, based on the comparison result.

Patent Document 3 describes that, in a system for providing a service using a membership card, card ID information and a terminal ID are registered and updated in association with each other in a database in such a way that the service can be similarly received by using a portable terminal other than the membership card.

RELATED DOCUMENTS

Patent Documents

[Patent Document 1] Japanese Patent Application Publication No. 2001-265738
[Patent Document 2] Japanese Patent Application Publication No. 2020-87461
[Patent Document 3] Japanese Patent Application Publication No. 2007-80006

SUMMARY OF INVENTION

Technical Problem

However, submission of a document by an electronic document is still limited to use by some limited people in general. The conceivable reason is that there are a lot of people who think that submission by a paper document is safer and easier due to awareness of not being good at operating a computer and a portable terminal, anxiety about reliability of security, and the like.

The present invention has been made in view of the circumstance described above, and an object thereof is to improve usability and security of certification processing such as an electronic signature.

Solution to Problem

In each aspect according to the present invention, each configuration below is adopted in order to solve the above-mentioned problem.

A first aspect relates to an information processing apparatus.

The information processing apparatus according to the first aspect includes:

an acquisition unit that acquires first personal identifiable information and terminal identifiable information from a storage medium of a portable type that stores the first personal identifiable information and the terminal identifiable information;

an authentication unit that authenticates second personal identifiable information acquired by a sensor mounted on the terminal and the terminal identifiable information of a terminal by using the first personal identifiable information and the terminal identifiable information being acquired from the storage medium; and an execution unit that executes predetermined processing when the authentication succeeds.

A second aspect relates to an information processing method executed by at least one computer.

The information processing method according to the second aspect includes, by an information processing apparatus:

acquiring first personal identifiable information and terminal identifiable information from a storage medium of a portable type that stores the first personal identifiable information and the terminal identifiable information;

authenticating second personal identifiable information acquired by a sensor mounted on a terminal and the terminal identifiable information of the terminal by using the first personal identifiable information and the terminal identifiable information being acquired from the storage medium; and executing predetermined processing when the authentication succeeds.

Note that, another aspect according to the present invention may be a program causing at least one computer to execute the method in the second aspect, or may be a computer-readable storage medium that stores such a program. The storage medium includes a non-transitory tangible medium.

The computer program includes a computer program code causing a computer to execute the information processing method on the information processing apparatus when the computer program is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, usability and security of certification processing such as an electronic signature can improve.

BRIEF DESCRIPTION OF THE DRAWINGS

FIG.2 It is a block diagram illustrating a hardware configuration of a computer that achieves an information processing apparatus according to the example embodiment of the present invention.

FIG. 9 It is a diagram illustrating an issuing application flow of an electronic certificate.

FIGS. 10A to 10E They are diagrams each illustrating a data structure example of a storage apparatus of an AP server.

FIGS. 11A to 11C They are diagrams each illustrating data stored in the memory of the IC chip of the identification card.

EXAMPLE EMBODIMENT

Hereinafter, example embodiments of the present invention will be described with reference to the drawings. Note that, in all of the drawings, a similar component has a similar reference sign, and description thereof will be not included appropriately. In each of the following drawings, a configuration of a portion unrelated to essence of the present invention is not included and not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

<System Outline>

Figure 1:
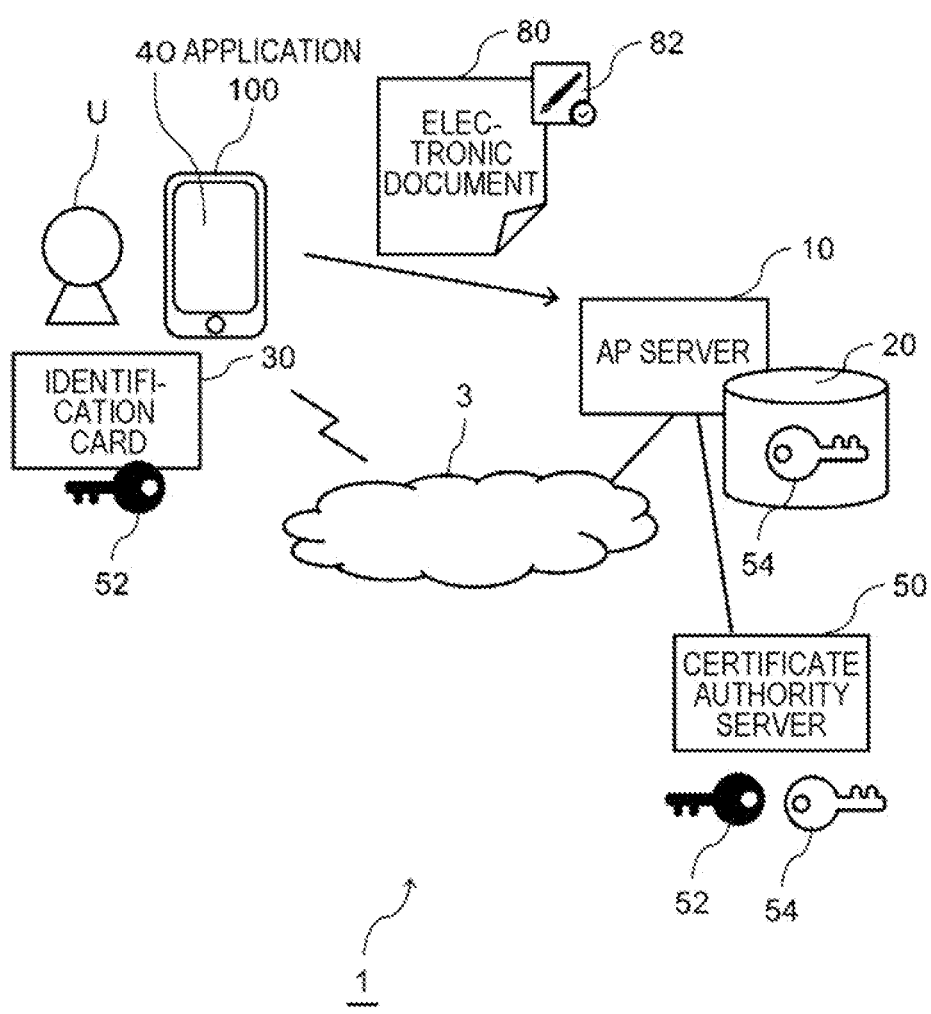
FIG.1 It is a diagram schematically illustrating a system configuration of an electronic procedure system according to an example embodiment of the present invention.

FIG. 1 is a diagram schematically illustrating a system configuration of an electronic procedure system 1 according to an example embodiment of the present invention. The electronic procedure system 1 includes an AP server 10 and an information processing apparatus 100. The AP server 10 may include a certificate authority 50 that issues an electronic certificate (for example, X.509), or may use the certificate authority 50 outside the AP server 10. The information processing apparatus 100 is a portable terminal possessed or used by a user U, and is, for example, a smartphone, a tablet terminal, a personal computer, and the like. Hereinafter, the information processing apparatus 100 is also referred to as a user terminal 100.

The information processing apparatus 100 can be implemented by installing an application program 40 in the user terminal 100 and activating the application program 40. According to an application from the user U, the certificate authority 50 issues, together with an electronic certificate, an electronic secret key for signature 52 and an electronic signature public key 54 that are an electronic signature public key pair. The electronic signature public key 54 and the electronic certificate may be in a form of (A) being stored in a storage apparatus 20 of the AP server 10 without being stored in an identification card 30, or may be in a form of (B) being stored in a memory of an IC chip of the identification card 30. In a case of (B), when the electronic signature public key 54 and the electronic certificate of the electronic signature public key 54 that are stored in the memory of the IC chip of the identification card 30 are received, the AP server 10 causes the certificate authority 50 to verify the electronic certificate of the electronic signature public key 54. The electronic secret key for signature 52 is stored together with the electronic certificate in the memory of the IC chip of the identification card 30 of the user U, for example. The user U can provide an electronic signature 82 to an electronic document 80 by using the electronic secret key for signature 52 stored in the identification card 30, and submit the electronic document 80 to a predetermined destination from the user terminal 100 via a communication network 3.

Hardware Configuration Example

Figure 2:
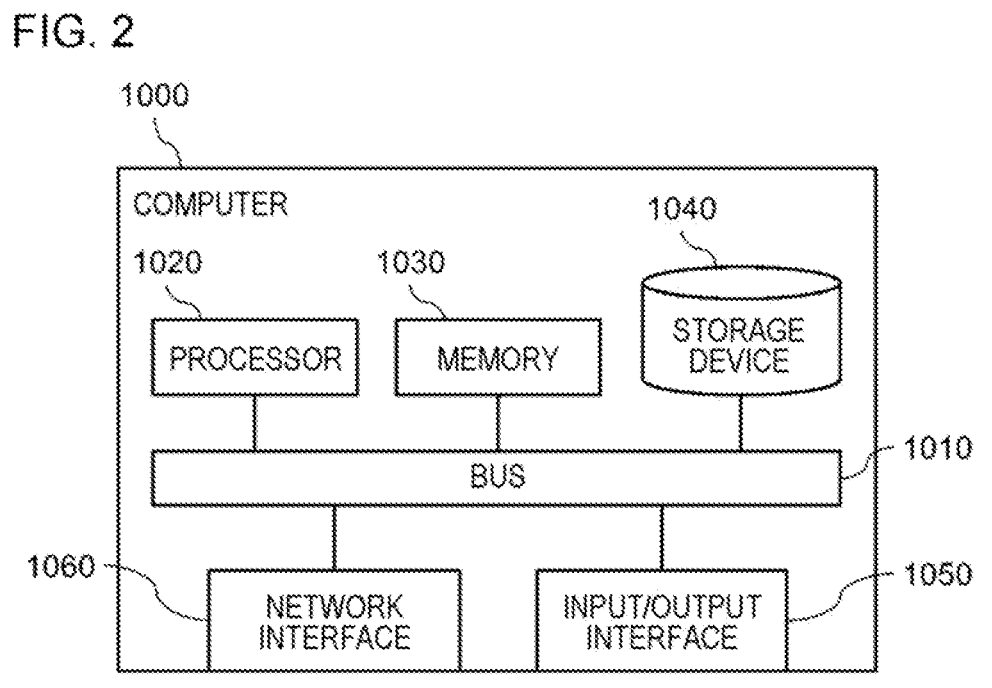

FIG. 2 is a block diagram illustrating a hardware configuration of a computer 1000 that achieves the information processing apparatus (user terminal) 100 described below. The AP server 10 and the certificate authority 50 in FIG. 1 are also achieved by the computer 1000.

The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor implemented by a central processing unit (CPU), a graphics processing unit (GPU), and the like.

The memory 1030 is a main storage apparatus implemented by a random access memory (RAM) and the like.

The storage device 1040 is an auxiliary storage apparatus implemented by a hard disk drive (HDD), a solid state drive (SSD), a memory card, a read only memory (ROM), or the like. The storage device 1040 stores a program module that implements each function (for example, an acquisition unit 102, an authentication unit 104, an execution unit 106, a registration unit 108, and the like described below) of the information processing apparatus (user terminal) 100. The processor 1020 reads each program module onto the memory 1030 and executes the program module, and each function associated with the program module is achieved. Further, the storage device 1040 may also store each piece of data of a storage unit 120 of the information processing apparatus (user terminal) 100 or the storage apparatus 20 of the AP server 10.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and several types of input/output equipment. The input/output interface 1050 also functions as a communication interface that performs short-range wireless communication, such as Bluetooth (registered trademark) and Near Field Communication (NFC).

The network interface 1060 is an interface for connecting the computer 1000 to the communication network 3 (FIG. 1). The communication network 3 is, for example, a local area network (LAN) and a wide area network (WAN).

Alternatively, the network interface 1060 may be an interface for connection to the communication network 3 by using a public network via a base station by using various communication methods such as 4th generation (4G), 5th generation (5G), and worldwide interoperability for microwave access (WiMAX). A method of connection to the communication network 3 by the network interface 1060 may be wireless connection or wired connection.

Then, the computer 1000 is connected to necessary equipment (for example, a display (touch panel), an operation button, a speaker, a microphone, a sensor that acquires personal identifiable information, such as a camera and/or a fingerprint sensor, and the like of the user terminal 100) via the input/output interface 1050 or the network interface 1060.

As described below, the information processing apparatus 100 acquires personal identifiable information such as a face picture to be used for performing authentication processing of identity verification of the user U. In the present example embodiment, the authentication processing is performed by using a face image of a person, but the authentication processing may be performed by using other biometric authentication information. The biometric authentication information includes, for example, at least any one of an iris, a vein, an auricle, a fingerprint, and a voiceprint. The authentication processing may be performed by combining a plurality of pieces of the biometric authentication information.

In the present example embodiment, the authentication processing using a face image is performed, and thus a guidance screen for capturing a face of the user U by using the camera of the user terminal 100 is displayed on the display of the user terminal 100. When the authentication processing using other biometric authentication information is performed, a sensor suitable for acquiring the biometric authentication information is used. For example, when a fingerprint is used, the acquisition unit 102 acquires fingerprint information by using the fingerprint sensor of the user terminal 100. When a voiceprint is used, the acquisition unit 102 collects a sound of the user U by using the microphone of the user terminal 100, and acquires voiceprint information.

The camera includes a lens and a capturing element such as a charge coupled device (CCD) image sensor. An image generated by the camera is preferably a moving image, but may be a frame image by each predetermined interval or may be a still image.

Figure 3:
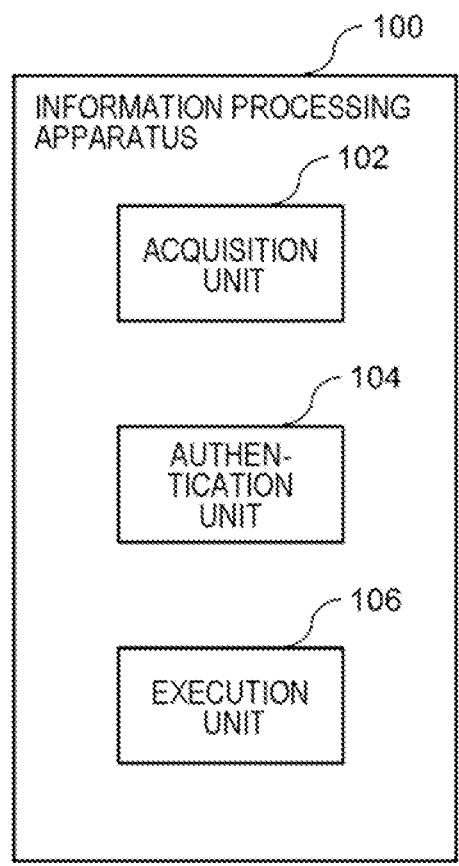
FIG.3 It is a functional block diagram illustrating a logical configuration of the information processing apparatus according to the present example embodiment.

FIG. 3 is a functional block diagram illustrating a logical configuration of the information processing apparatus 100 according to the present example embodiment. As described above, the information processing apparatus 100 is implemented by installing the application program 40 in the user terminal 100 and executing the application program 40.

Each component of the information processing apparatus 100 (user terminal) according to the present example embodiment in FIG. 3 is implemented by any combination of hardware of the computer 1000 in FIG. 2 and software. Then, various modification examples of an implementation method and an apparatus thereof are understood by a person skilled in the art. A functional block diagram illustrating the information processing apparatus according to each embodiment described below illustrates a block of logical functional units instead of a configuration of hardware units.

The information processing apparatus 100 includes an acquisition unit 102, an authentication unit 104, and an execution unit 106. The acquisition unit 102 acquires first personal identifiable information and terminal identifiable information from a storage medium of a portable type in which the first personal identifiable information and the terminal identifiable information are stored. The authentication unit 104 authenticates second personal identifiable information acquired from a sensor mounted on a terminal and terminal identifiable information of the terminal by using the first personal identifiable information and the terminal identifiable information that are acquired from the storage medium. The execution unit 106 executes predetermined processing when the authentication succeeds.

The first personal identifiable information stored in the storage unit 120 of the user terminal 100 is, for example, face picture data about a person or a feature value of a face that has already been subjected to identity verification in advance by electronic know your customer (eKYC) and the like.

The terminal identifiable information is identification information that can uniquely determine the user terminal 100. As one example, the terminal identifiable information is identification information being assigned to each user terminal 100 (or each piece of application software installed in the user terminal 100) by the AP server 10. For example, when the user terminal 100 installs the application program 40 of the electronic procedure system 1, the terminal identifiable information may be assigned by the AP server 10.

In another example, the terminal identifiable information may be a unique identification number being assigned to each individual of a portable terminal, such as individual identification information (UID: unique identifier), international mobile equipment identifier (IMEI), and a media access control (MAC) address of the user terminal 100.

The storage medium of the portable type is, for example, an identification card such as a driver's license, a health insurance card, a national identification number card, and a passport, and is indicated as the identification card 30 in FIG. 1 and the like. A shape of the storage medium of the portable type is a card type, a sheet shape, a booklet, and the like, which are not particularly limited thereto. A face picture of a person is preferably printed. An IC chip including a memory that can store information is preferably mounted on the identification card 30.

As an example, a national identification number card is a plastic card having a predetermined thickness, includes a face picture and a name printed on one surface, and includes an individual number (also referred to as a national identification number) printed on the other surface.

Figure 4:
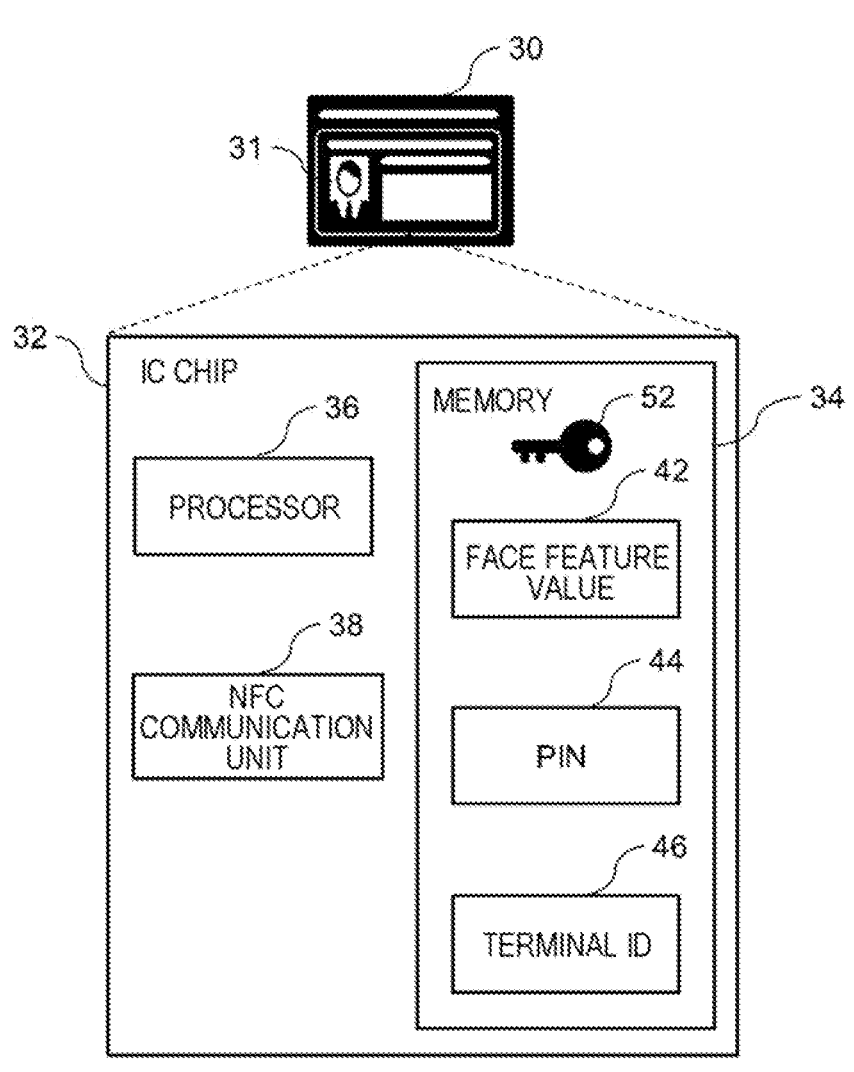
FIG. 4 It is a diagram illustrating an identification card on which an IC chip is mounted.

FIG. 4 is a diagram illustrating the identification card 30 (national identification number card) on which an IC chip 32 is mounted. The IC chip 32 includes a memory 34, a processor 36, and an NFC communication unit 38 that communicates with the user terminal 100 such as, for example, a smartphone through NFC. The electronic secret key for signature 52, the first personal identifiable information (feature value 42), a personal identification number (PIN) code 44, and the terminal identifiable information (terminal ID 46) are stored in the memory 34. The electronic secret key for signature 52 is used when the electronic signature 82 is given to the electronic document 80 as predetermined processing, which will be described in detail in an example embodiment described below. In the present example embodiment, processing for performing identity verification is performed in order to safely read the electronic secret key for signature 52 from the identification card 30 and use the electronic secret key for signature 52.

The first personal identifiable information (face feature value 42) stored in the memory 34 is also, for example, face picture data about a person or a feature value of a face that has already been subjected to identity verification in advance by eKYC and the like. In the example embodiment described below, the first personal identifiable information is a face feature value certified in a procedure (procedure P5 in FIG. 8) of storing identity verification information in the user terminal 100. The terminal identifiable information (terminal ID 46) stored in the memory 34 is information written in advance from the user terminal 100 into the identification card 30 by processing of associating the user terminal 100 and the identification card 30, which will be described in detail in the example embodiment described below.

The PIN code 44 is an identification number formed of a predetermined number of digits (for example, four digits, six digits, and the like) of numbers (or may include an alphabet and a symbol) being needed to be input when information stored in the memory 34 is read and being preset by the user U. The PIN code 44 is set by the user U when an electronic certificate is registered in a national identification number card in a public office or the like, for example, and is stored in the memory 34. For example, when the information stored in the memory 34 is read, first, a PIN code is input by the user terminal 100 and transmitted to the IC chip 32. The processor 36 collates the received PIN code with the PIN code 44 stored in the memory 34. Reading of the information stored in the memory 34 is permitted when authentication succeeds, and reading is not permitted when the authentication fails.

The acquisition unit 102 of the user terminal 100 transmits the PIN code and performs NFC communication with the NFC communication unit 38 of the IC chip 32, and can read and acquire the information stored in the memory 34 when the authentication succeeds. In this way, unauthorized reading of the information stored in the memory 34 in the identification card 30 can be prevented by the PIN code.

Further, the user terminal 100 may read and write the information in the memory 34 via a reader/writer for reading and writing the information stored in the memory 34. In other words, the acquisition unit 102 may acquire the first personal identifiable information and the terminal identifiable information from the IC chip 32 of the identification card 30 via the reader/writer.

Figures 5A, 5B:
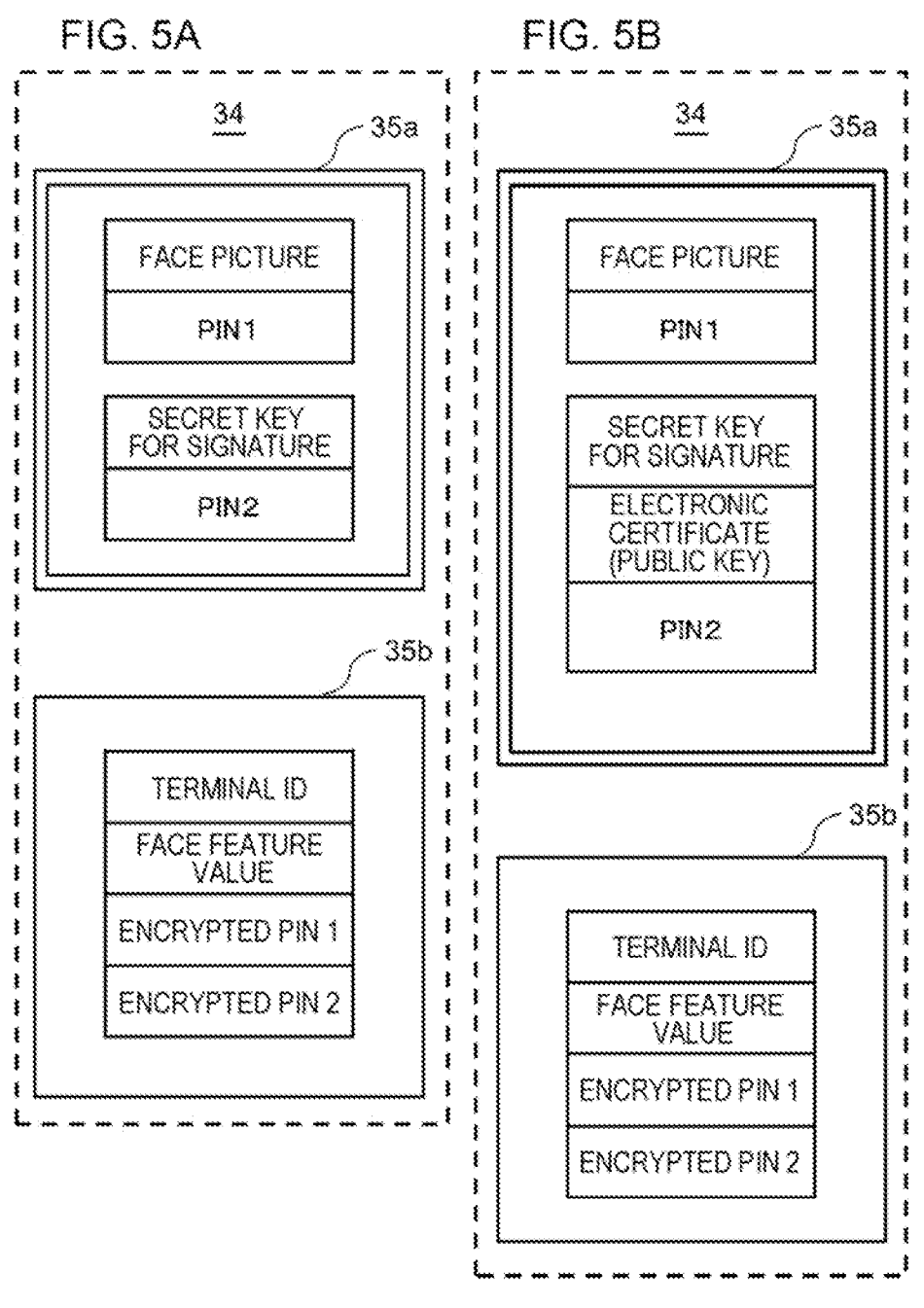
FIGS. 5A and 5B They are diagrams each illustrating a data structure example of a memory of the IC chip of the identification card.

FIGS. 5A and 5B are diagrams each illustrating a specific example of data stored in the memory 34 of the IC chip 32 of the identification card 30. FIG. 5A illustrates a data structure example of the memory 34 in the form of (A) described above of not storing the electronic signature public key 54 in the identification card 30. FIG. 5B illustrates a data structure example of the memory 34 in the form of (B) described above of storing the electronic signature public key 54 in the identification card 30.

The memory 34 includes a basic area 35a and an expansion area 35b. In the basic area information needed for an original usage purpose of the identification card 30 is mainly stored in an area used by an issuing source and a management organization of the identification card 30. In the expansion area 35b, information needed for providing various services is mainly stored in an area permitted to be used by various organizations (for example, a private enterprise) that provide various services including an electronic procedure using the identification card 30. The basic area 35a is desired to have a structure that cannot be used by a private enterprise and the like.

In the basic area 35a of the memory 34 in FIG. 5A, image data about a face picture of the user U being printed on the front of the identification card 30, a first PIN code (for example, four digits of numbers) (indicated as "PIN1" in FIG. 5A) for reading the image data about the face picture from the memory 34, an electronic secret key for signature, and a second PIN code (for example, six or more digits of letters and numbers) (indicated as "PIN2" in FIG. 5A) for reading the electronic secret key for signature are stored.

Note that, when it is determined that unauthorized reading of the electronic secret key for signature stored in the basic area 35*a* is attempted by tampering and the like without an input of a PIN code, the memory 34 may be locked, data in the memory 34 may be deleted, and the IC chip 32 including the memory 34 may be destroyed.

In the expansion area 35*b*, a terminal ID, a face feature value, and information in which the first PIN code and the second PIN code described above are encrypted are stored. The terminal ID also functions as a PIN code permitted to access the expansion area 35*b*. The encrypted first PIN code stored in the expansion area 35*b* can be decrypted when face authentication of the user U succeeds by collation between the face feature value stored in the expansion area 35*b* and the face image of the user U captured by the user terminal 100. In other words, when the face authentication succeeds, reading of the face picture from the basic area 35*a* can be achieved by using the decrypted first PIN code. Similarly to the encrypted first PIN code described above, for the encrypted second PIN code stored in the expansion area 35*b*, reading of the electronic secret key for signature from the basic area 35*a* can be achieved by using the decrypted second PIN code when the face authentication succeeds. Writing of information from the present electronic procedure system 1 into the expansion area 35*b* will be described below.

FIG. 5B illustrates an example in which an electronic signature public key and an electronic certificate of the electronic signature public key in addition to the information stored in the basic area 35*a* of the memory 34 in FIG. 5A are further stored in the basic area 35*a*. Furthermore, the second PIN code is used not only as the electronic secret key for signature but also as a PIN code for reading the electronic signature public key and the electronic certificate. Similarly to the encrypted first PIN code described above, reading of the electronic secret key for signature, the electronic signature public key, and the electronic certificate from the basic area 35*a* can be achieved by using the decrypted second PIN code when the face authentication succeeds.

The predetermined processing executed by the execution unit 106 is processing that requires identity verification such as processing of giving the electronic signature 82 to the electronic document 80 to be submitted to a predetermined organization, for example. Examples include processing of giving the electronic signature 82 to the electronic document 80 and transmitting the electronic document 80 to a predetermined destination when a final return document is electronically submitted, and the like. Alternatively, the predetermined processing may also include certification processing needed for receiving various services such as when the identification card 30 (for example, a case of a national identification number card or the like) is used as a health insurance card, a driver's license, an identification card, or the like, when an administrative procedure related to a national identification number is performed, when a housing loan, a real estate transaction, or the like is used for a contract online, when a receiving service of a certificate of residence, a family register, or the like is used at a convenience store or the like, and the like in various services using the identification card 30.

In an example of a final return, the user U activates a predetermined browser by using the user terminal 100, and accesses a predetermined Web page of National Tax Agency. After necessary information is input, the electronic signature 82 is given to the electronic document 80 of a final return document, and the final return document is transmitted via the communication network 3 such as the Internet.

In such a Web page of a final return of National Tax Agency, when the electronic signature 82 is provided to the electronic document 80, the information processing apparatus 100 (application program 40) according to the present example embodiment is activated. Then, identity verification is performed by a procedure described below, and then the electronic signature 82 can be provided to the electronic document 80 by using the electronic secret key for signature 52 stored in the memory 34 of the identification card 30, and transmitted and submitted to a predetermined destination.

Operation Example

Figure 6:
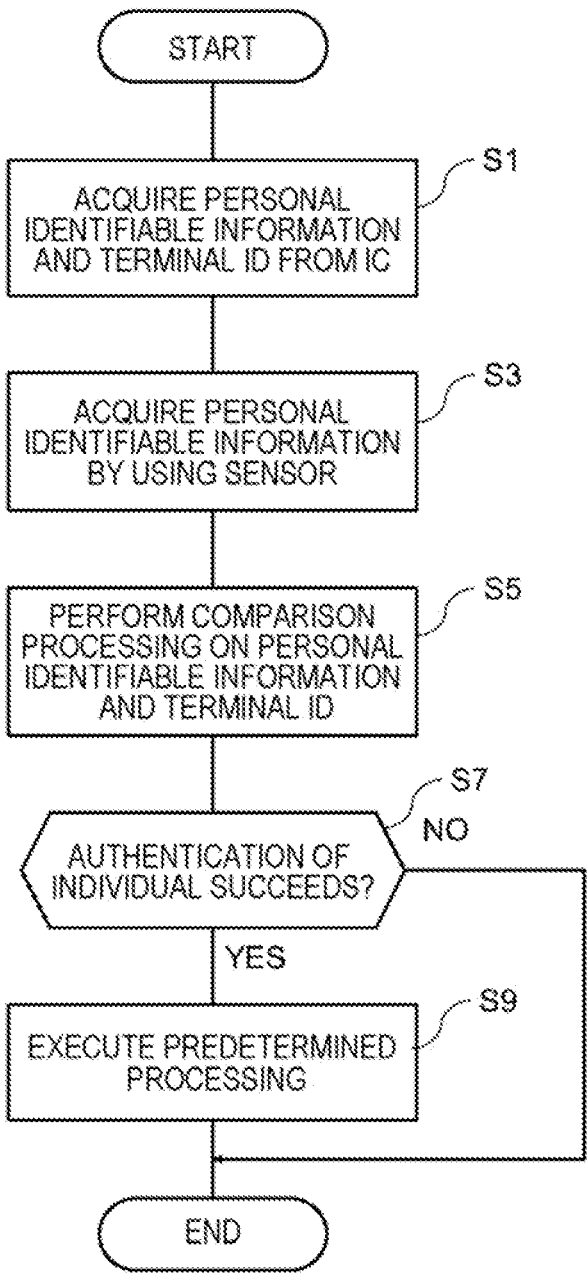
FIG. 6 It is a flowchart illustrating an operation example of the information processing apparatus according to the present example embodiment.

FIG. 6 is a flowchart illustrating an operation example of the information processing apparatus 100 according to the present example embodiment.

First, the acquisition unit 102 acquires first personal identifiable information and terminal identifiable information from the IC chip 32 of the identification card 30 (step S1). In this example, the first personal identifiable information is a face image of the user U or a feature value of a face. The terminal identifiable information is a terminal ID being assigned when the application program 40 is installed in the user terminal 100.

Specifically, the acquisition unit 102 displays, on the display, a guidance screen for the user U to read information from the identification card 30. The user U brings the identification card 30 close to a predetermined position of the user terminal 100 according to an instruction of the guidance screen. The acquisition unit 102 reads and acquires the face feature value 42 and the terminal ID 46 that are stored in the memory 34 of the IC chip 32 by communicating with the NFC communication unit 38 of the identification card 30. As described above, the face feature value 42 is a feature value of a face that has already been subjected to identity verification in advance.

Normally, when information is read from the memory 34 of the identification card 30, a preset PIN code needs to be input and authentication needs to succeed. As described in the example embodiment described below, in the electronic procedure system 1, the PIN code 44 is input in advance to associate the identification card 30 and the user terminal 100 with each other, and thus an input of a PIN code can be eliminated when predetermined processing is performed later.

Next, the authentication unit 104 acquires second personal identifiable information by using the sensor (step S3). Specifically, the camera of the user terminal 100 is activated, and the guidance screen for capturing a face image of the user U is also displayed on the display. The user U can perform capturing of a face image by operating according to an instruction of the guidance screen. As described above, liveness verification may also be used in order to prevent unauthorized behavior such as spoofing using a life-size face picture of another person and the like.

Then, the authentication unit 104 collates the first personal identifiable information (the face feature value 42 read from the IC chip 32) acquired in step S1 with the second personal identifiable information (the face image (face feature value) captured by the user terminal 100) acquired in step S3, and also collates the terminal identifiable information (the terminal ID 46 read from the IC chip 32) acquired in step S1 with terminal identifiable information stored in the storage unit 120 (step S5). When the authentication of both of the personal identifiable information and the terminal identifiable information succeeds (YES in step S7), the execution unit 106 executes predetermined processing (step S9). When the authentication of at least one of the personal identifiable information and the terminal identifiable information fails (NO in step S7), step S9 is bypassed, and the present processing ends. In other words, the predetermined processing by the execution unit 106 is not executed.

As described above, the predetermined processing is, for example, processing of giving the electronic signature 82 to the electronic document 80. Details will be described in a second embodiment described below.

As described above, in the present example embodiment, the acquisition unit 102 reads the first personal identifiable information (face feature value) and the terminal identifiable information (terminal ID) from the identification card 30 and the like, and the authentication unit 104 collates the second personal identifiable information (face image or face feature value) acquired by the sensor such as the camera of the user terminal 100 with the first personal identifiable information acquired by the acquisition unit 102, and also collates the terminal identifiable information of the user terminal 100 with the terminal identifiable information acquired by the acquisition unit 102. Then, when the authentication by the authentication unit 104 succeeds, the execution unit 106 can perform the predetermined processing of, for example, providing the electronic signature 82 to the electronic document 80.

In this way, according to the configuration of the present example embodiment, unauthorized behavior such as spoofing can be prevented by performing certification processing of identity verification by using the identification card 30 and the user terminal 100, and predetermined processing that requires the identity verification can be rightfully performed. Then, predetermined processing of giving the electronic signature 82 to the electronic document 80, or the like can be performed just by performing identity verification by the user terminal 100 without performing a complicated operation. Thus, usability and security of an electronic signature improve.

Second Example Embodiment

Figure 7:
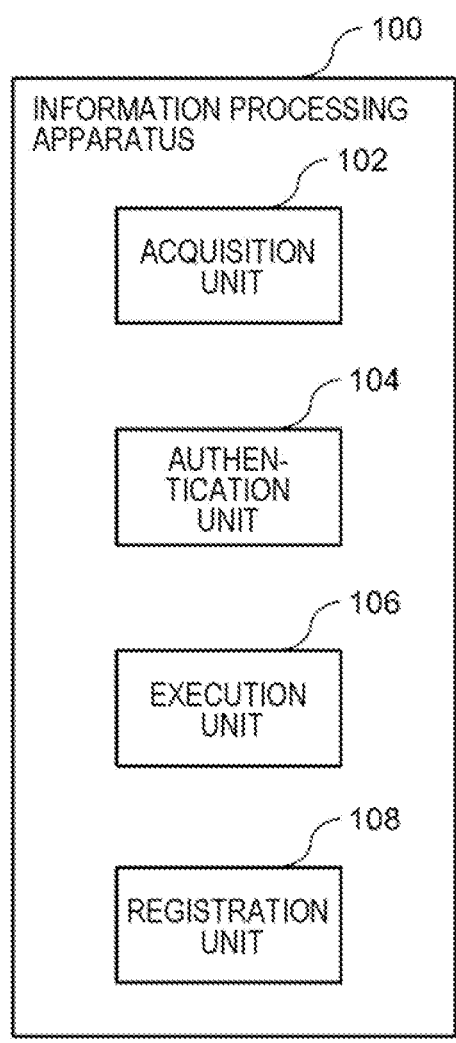
FIG. 7 It is a functional block diagram illustrating a logical configuration of the information processing apparatus according to the present example embodiment.

FIG. 7 is a functional block diagram illustrating a logical configuration of an information processing apparatus 100 according to the present example embodiment. The information processing apparatus 100 according to the present example embodiment is similar to that in the example embodiment described above except for a point that the information processing apparatus 100 according to the present example embodiment has a configuration for performing processing of associating, with a user terminal 100, an identification card 30 in which an electronic secret key for signature 52 needed for predetermined processing is stored. The information processing apparatus 100 according to the present example embodiment further includes a registration unit 108 in addition to the configuration in FIG. 3. However, the configuration of the present example embodiment can be combined as long as the present example embodiment is not inconsistent with at least any one of configurations of other example embodiments.

As a result of authentication by the authentication unit 104 by using first personal identifiable information (face image) and second personal identifiable information (face feature value) that is stored in a storage unit 120 of the user terminal 100 and has already been subjected to personal identification, when the authentication succeeds, the registration unit 108 stores terminal identifiable information (terminal ID 46) in a storage medium (an IC chip 32 of the identification card 30).

<Electronic Procedure System Usage Flow>

In order for a user U to use an electronic procedure system 1, a predetermined procedure needs to be performed in advance. Hereinafter, an advance preparation for performing a procedure of giving an electronic signature 82 to an electronic document 80 by using the information processing apparatus 100 and the identification card 30 on which the IC chip 32 is mounted, such as a national identification number card, will be described.

Figure 8:
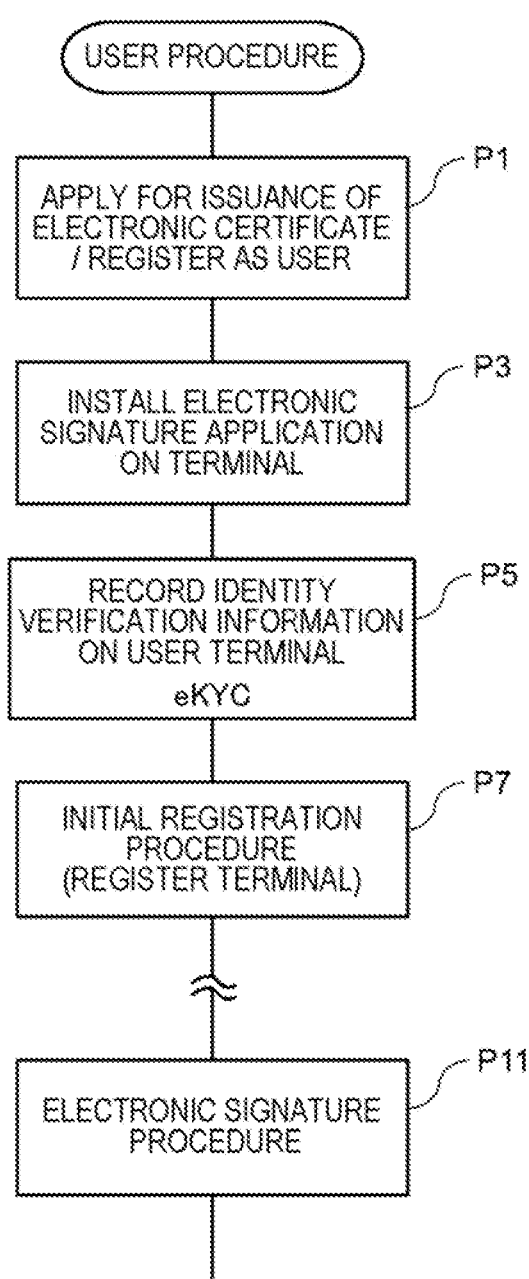
FIG. 8 It is a diagram illustrating one example of a usage flow of the electronic procedure system.

FIG. 8 is a diagram illustrating one example of a usage flow of the electronic procedure system 1. Hereinafter, an example of using, as the identification card 30, a national identification number card on which the IC chip 32 is mounted will be described. Herein, the identification card 30 is also referred to as a national identification number card 30a. An example of using the identification card 30 on which the IC chip 32 is not mounted will be described in a fourth embodiment described below.

First, the user U goes to a predetermined application place with the national identification number card 30a, and performs an issuing application procedure of an electronic certificate (procedure P1). At this time, usage registration (user registration) of the electronic procedure system 1 is also performed, and account information about the user U being needed for logging in to the electronic procedure system 1 is also set. Then, an application program 40 of the electronic procedure system 1 is installed in the user terminal 100 (procedure P3).

Next, a face image (face feature value) subjected to identity verification by eKYC and the like is stored in the storage unit 120 of the user terminal 100 (procedure P5). Then, an initial registration procedure for using the electronic procedure system 1 is performed via the application 40 (procedure P7). By the processing described above, the identification card 30, the user terminal 100, and the application program 40 can be associated with one another by the terminal ID 46.

When the preparation up to this point ends, the electronic procedure such as an electronic signature procedure (procedure P11) can be performed as necessary. Details of each procedure will be described below.

<P1: Electronic Certificate Issuing Application Flow>

Figure 9:
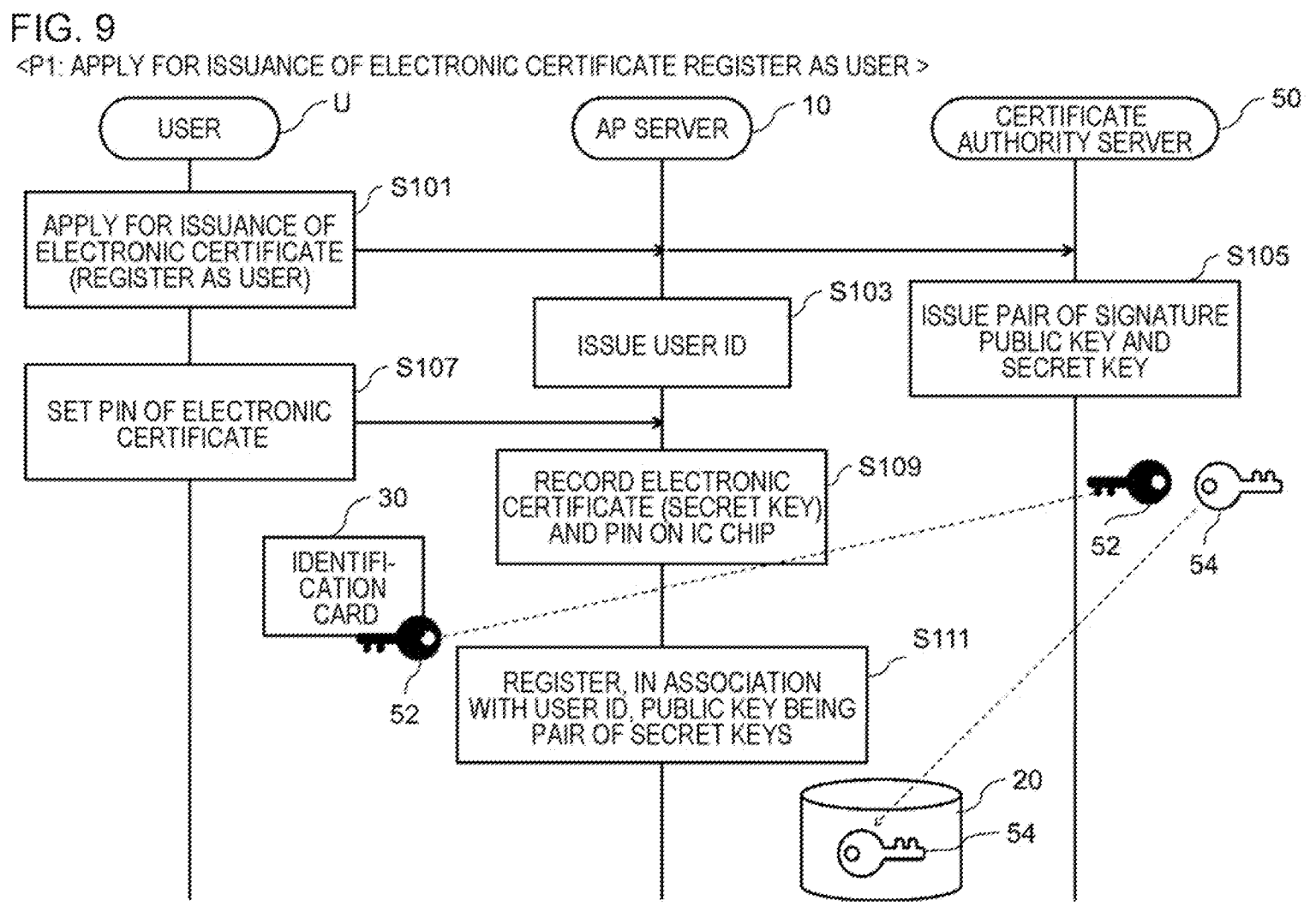

FIG. 9 is a diagram illustrating an issuing application flow of an electronic certificate. As the electronic certificate, there are an electronic certificate for an electronic signature, and an electronic certificate for user certification for performing identity verification when various services are used. Herein, issuing of an electronic certificate for an electronic signature will be described, but an issuing application can also be performed on an electronic certificate for user certification by similar processing.

First, a user U brings the identification card 30 (for example, the national identification number card 30a on which the IC chip 32 is mounted) to a predetermined application place. Then, an issuing application of an electronic certificate is performed (step S101). For example, a person at a window operates an operation terminal (not illustrated) for an AP server 10, and receives the application. When information needed for the application is input from the operation terminal, the AP server 10 issues a user ID to the user U, and performs user registration (step S103). The user ID is account information needed for logging in to the electronic procedure system 1 when the electronic procedure system 1 is used. At a time of a login, an input of any password being set by the user U and the user ID is required as the account information about the user U. The password may be able to be appropriately changed by the user U for a security improvement. As illustrated in FIG. 10A, the account information (the user ID and the password) about the user U is stored in a storage apparatus 20.

Issuing of the user ID is not necessarily needed, and a login may be performed by using the terminal identifiable information (terminal ID 46) assigned from the AP server 10 to each user terminal 100. In other words, when a face of the user U is captured by using the user terminal 100, and face authentication is performed and succeeds, the terminal ID 46 may be acquired and able to be used as login information to the AP server 10. Since the terminal ID 46 is acquired by success in the face authentication, an input of a password for logging in to the AP server 10 may be unnecessary.

Furthermore, the AP server 10 causes a certificate authority 50 to issue a pair of an electronic signature public key 54 and an electronic secret key for signature 52 and an electronic certificate (step S105). Note that, step S105 may be performed after the user ID is issued in step S103 and user registration is completed. Furthermore, the user U is caused to set an identification number (also referred to as a PIN code) being input at a time of issuing of the electronic certificate, and caused to input the identification number by using an operation terminal (step S107).

The AP server 10 stores, in a memory 34 of the IC chip 32 of the national identification number card 30a of the user U, the electronic secret key for signature 52 issued by the certificate authority 50 and a PIN code 44 input by the user U (step S109). FIG. 11A illustrates data stored in the memory 34 of the IC chip 32 of the national identification number card 30a. For the information, the data are stored particularly in a predetermined area of the memory 34 of the IC chip 32. As described above, the data stored in the memory 34 can be read when an input of the PIN code 44 is received. In other words, even when the identification card 30 is lost or stolen at the worst, a possibility that the information stored in the identification card 30 is not read increases as long as the PIN code 44 is not known.

Furthermore, the AP server 10 stores, in the storage apparatus 20 (FIG. 10B), the electronic signature public key 54 being a pair of the electronic secret key for signature 52 of the user U in association with the user ID of the user U (step S111).

In the memory 34 of the IC chip 32 in FIG. 11B, a face feature value 42 indicating data about a face picture printed on the front of the national identification number card 30a or a feature value extracted from the face picture may be further stored.

<P3: Installation of Application>

In the procedure P3 in FIG. 8, the application program 40 for using the electronic procedure system 1 is downloaded in the user terminal 100 of the user U. A pair of a common public key for challenge 58 and a common challenge secret key 56 is associated in the application program 40 downloaded in the user terminal 100 of each user U, and identification information about the application program 40 and the public key for challenge 58 are stored in association with each other in the storage apparatus 20 (FIG. 10D). The identification information about the application program 40 may be, for example, information indicating a version of the application program 40. Further, even when the application program 40 is the same version, the public key for challenge 58 may be changed to a different public key for challenge 58 after a predetermined period has elapsed or at any timing in order to avoid a risk of hacking and the like caused by the same public key for challenge 58 continuing to be used. Thus, for example, information such as an acquisition date and time (acquisition date and time from the certificate authority 50) of the public key for challenge 58 may be stored in association in the storage apparatus 20 (FIG. 10D).

Figures 12A, 12B, 12C:
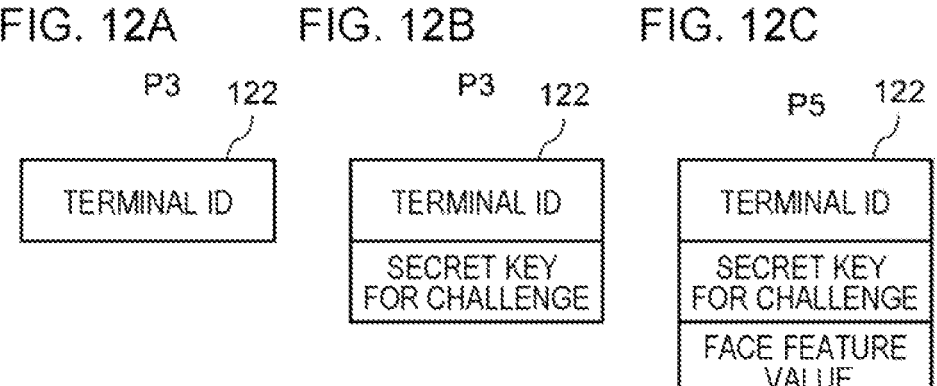
FIGS. 12A to 12D They are diagrams each illustrating a data structure example of a storage unit of a user terminal.

The downloaded application is installed in the user terminal 100. After the installation, for causing a login to the electronic procedure system 1, the information processing apparatus 100 displays, on a display of the user terminal 100, a login screen that requests an input of the account information (the user ID and the password). Then, when the account information is received, the AP server 10 performs authentication processing of the user U, and also stores the terminal identifiable information (indicated as a terminal ID in FIG. 10C) of the user terminal 100 of the user U in association with the user ID of the user U in the storage apparatus 20 (FIG. 10C). The terminal ID assigned by the AP server 10 is stored in a security area 122 of the storage unit 120 (FIG. 12A).

Furthermore, when the application program 40 is installed in the user terminal 100, the challenge secret key 56 is also downloaded together and stored in the storage unit 120 of the user terminal 100. The challenge secret key 56 may be encoded by a white box code and stored, or may be stored in a predetermined area of the storage unit 120. The predetermined area is preferably the security area 122 (FIG. 12B) that cannot be accessed by an operating system (OS) and another application.

<P5: Identity Verification Procedure>

Figure 13A:
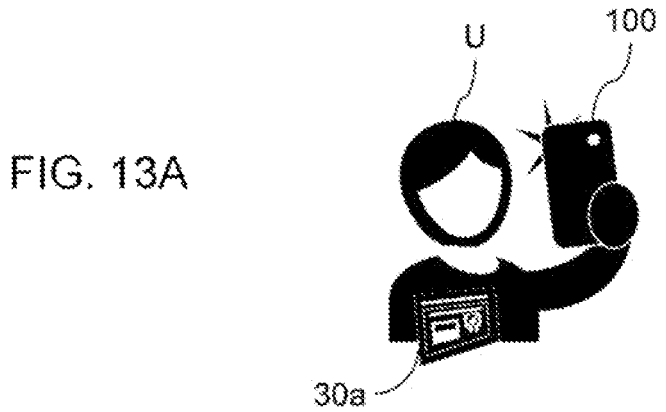
FIGS. 13A and 13B They are diagrams each illustrating identity verification procedure.
Figure 13B:
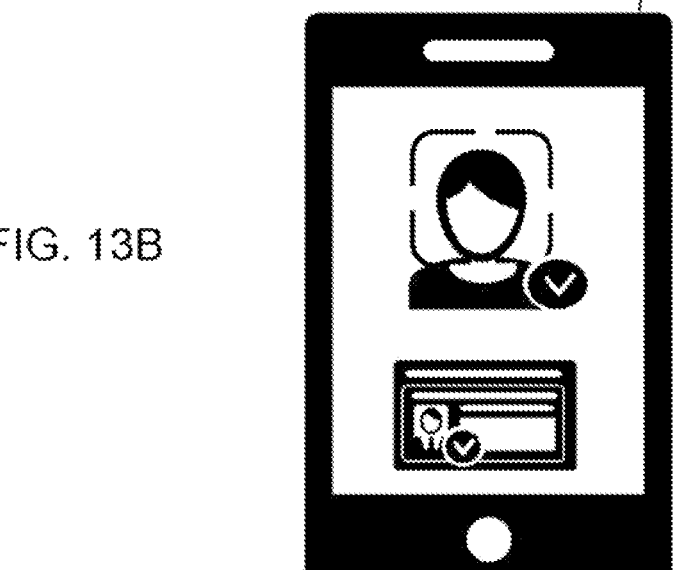

FIGS. 13A and 13B are diagrams each illustrating a identity verification procedure. As illustrated in FIG. 13A, the user U captures a face picture printed on the front of the national identification number card 30a together with a face of the user U by using a camera of the user terminal 100. FIG. 13B illustrates a scene in which an image in which the face of the user U is captured and an image in which the national identification number card 30a including the face picture on the front of the national identification number card 30a is captured are imported into the user terminal 100. The processing of the identity verification may be performed by installing an application for the identity verification in the user terminal 100, or may be performed on a predetermined Web site via a browser.

In order to guarantee that a captured face is not "spoofing" and the like using a picture and the like and that a person is real, it is preferable that capturing by a moving image is performed and liveness verification is performed.

Figure 12D:
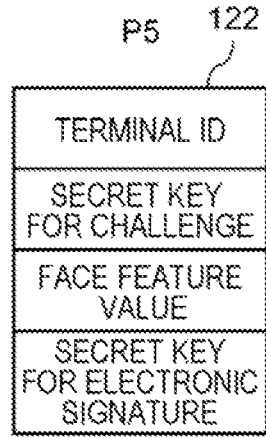

Then, face feature values extracted from the face image of the user U himself/herself and the face picture of the national identification number card 30a are collated. When the person is authenticated as the user U as a result of the collation, the authenticated face feature values are stored in the security area 122 (FIG. 12 (*c*)) (FIG. 12C) of the storage unit 120 of the user terminal 100. Furthermore, the authenticated face feature values are written into the memory 34 of the IC chip 32 of the identification card 30.

<P7: Application Initial Registration Procedure>

Figure 14:
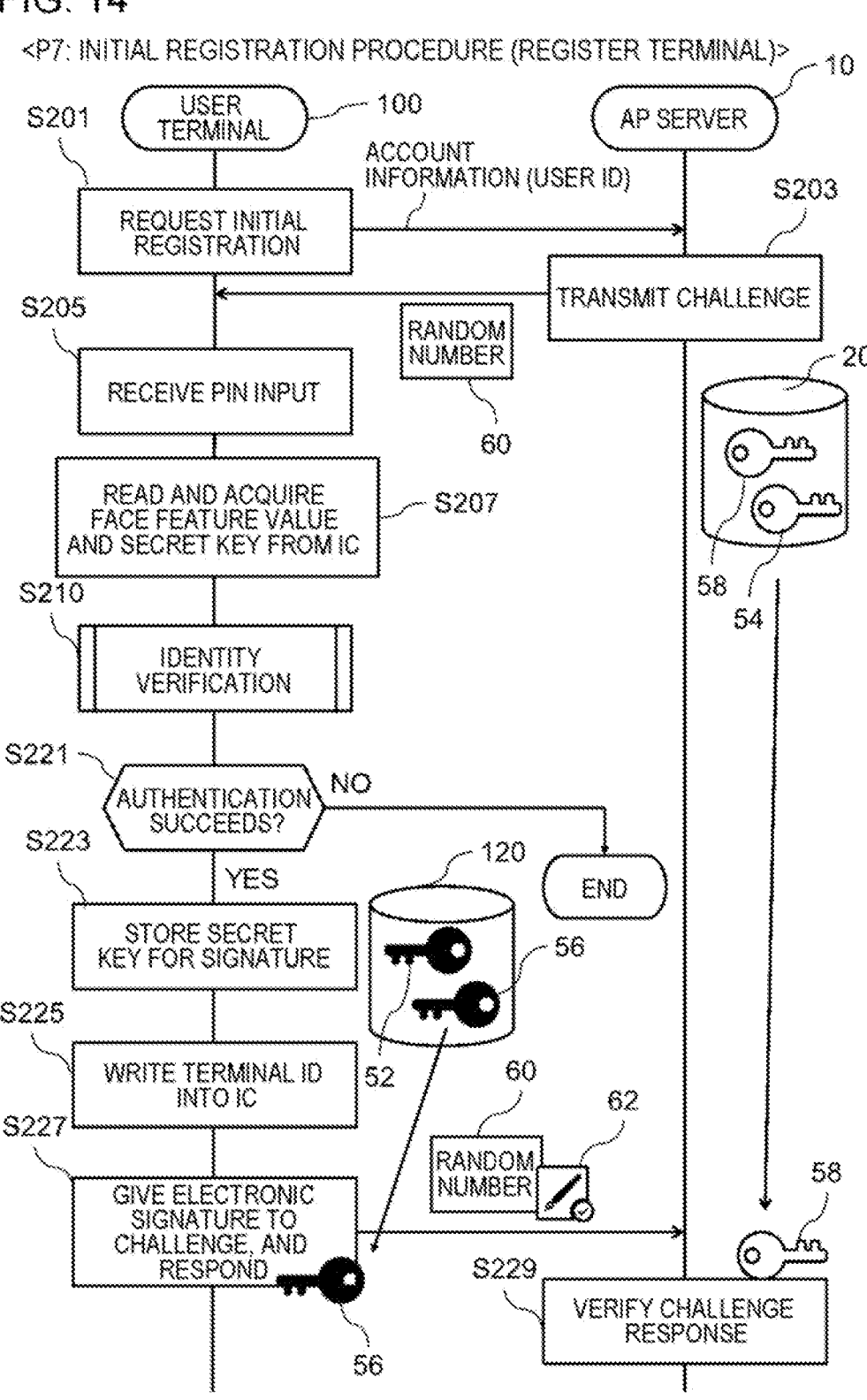
FIG. 14 It is a diagram illustrating a flow of an initial registration procedure.

FIG. 14 is a diagram illustrating a flow for initial setting in the procedure P7 in FIG. 8 being performed when a program is first activated after the application is downloaded in the user terminal 100 of the user U in the procedure P3 in FIG. 8. However, the present processing may also be performed when the application is downloaded, and the program is used and then deleted, and also when the application is downloaded again and activated. Further, the present processing is also performed when the user U changes the user terminal 100 to a different model, and also when the application is downloaded again in a new model and activated.

In the flow, as the initial setting for using an application of the electronic procedure system 1, personal identification of the user U and a registration procedure of the user terminal 100 that operates the application are performed. First, when the application is activated in the user terminal 100, an initial registration screen is displayed, and the user U inputs account information and starts initial registration processing (step S201). When the AP server 10 receives the account information about the user U, the AP server 10 performs challenge/response authentication on the user terminal 100 (step S203). Specifically, the AP server 10 generates a random number (challenge) 60, and transmits the random number 60 to the user terminal 100.

Before the user terminal 100 responds to the challenge from the AP server 10, the user terminal 100 performs the identity verification and then processing (step S205 to step S225) of associating the identification card 30 and the user terminal 100 with each other. First, an acquisition unit 102 displays, on the display of the user terminal 100, a screen for inputting the PIN code 44 for accessing the identification card 30.

When an input of the PIN code 44 is received (step S205), the acquisition unit 102 performs NFC communication with the identification card 30, transmits the PIN code 44, and reads and acquires the face feature value 42 and the electronic secret key for signature 52 that are stored in the identification card 30 (step S207). Note that, in a case of an example (form in which a PIN code is not encrypted in the example of FIG. FIG. 5A) in which a different PIN code is set for each of a face feature value and an electronic secret key for signature, an input of a first PIN code and a second PIN code may be received. The face feature value may be read from the identification card 30 by using the first PIN code, and the electronic secret key for signature may also be read from the identification card 30 by using the second PIN code.

At this time, in the identification card 30, the PIN code 44 received from the user terminal 100 is collated with the PIN code 44 stored in the identification card 30, and reading of information stored in the identification card 30 is permitted when the PIN codes coincide with each other. When the PIN codes do not coincide with each other as a result of the collation, reading of the information stored in the identification card 30 is not permitted.

Then, the user terminal 100 performs identity verification processing (step S210).

Figure 15:
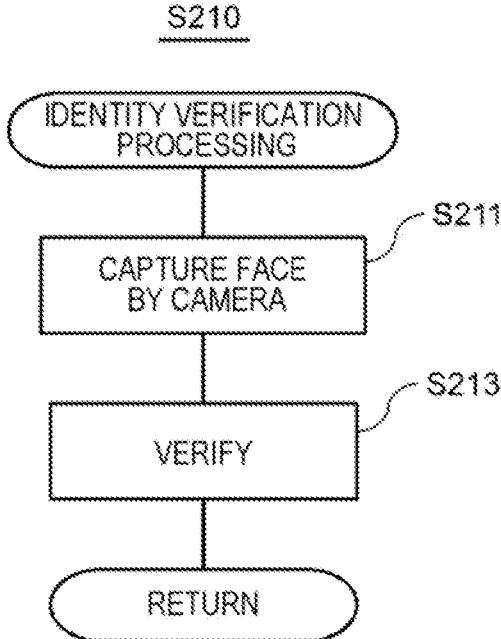
FIG. 15 It is a flowchart illustrating one example of a procedure of identity verification processing.

FIG. 15 is a flowchart illustrating one example of a procedure of the identity verification processing. First, the acquisition unit 102 activates the camera of the user terminal 100, and displays, on the display of the user terminal 100, a guidance screen for causing the user U to capture his/her face. Then, the face is captured, and a face image is acquired (step S211). The authentication unit 104 collates a feature value of the face extracted from the face image captured by the camera with the face feature value 42 being read and acquired from the identification card 30 in step S207 (step S213). Further, when the acquisition unit 102 acquires the face image of the person by camera capturing, it is preferable that capturing by a moving image is performed in order to prevent spoofing, and the authentication unit 104 performs liveness verification.

Herein, the following combinations of information for performing identity verification are conceivable, which are not limited thereto. The identity verification processing may be performed in at least one pattern of the following patterns, a plurality of patterns may be combined, or a pattern may be changed at a predetermined timing.

(Pattern 1) A feature value of a face extracted from a face image captured by the camera is collated with the face feature value 42 acquired from the identification card 30.

(Pattern 2) A feature value of a face extracted from a face image captured by the camera is collated with a face feature value stored in the security area 122 of the storage unit 120 of the user terminal 100 when identity verification is performed by eKYC (procedure P5 in FIG. 8).

(Pattern 3) A feature value of a face extracted from a face image captured by the camera is collated with a feature value of a face extracted from an image of a face picture on the front of the identification card 30 being captured by the camera.

(Pattern 4) A feature value of a face extracted from an image of a face picture on the front of the identification card 30 being captured by the camera is collated with a face feature value stored in the security area 122 of the storage unit 120 of the user terminal 100 when identity verification is performed by eKYC (procedure P5 in FIG. 8).

Returning to FIG. 14, when a result of the verification processing by the authentication unit 104 indicates that personal authentication succeeds (YES in step S221), the acquisition unit 102 stores the acquired face feature value 42 and the acquired electronic secret key for signature 52 in the security area 122 (FIG. 12D) of the storage unit. 120 (step S223). When the personal authentication fails (NO in step S221), the user U is notified that the authentication fails and thus the processing is interrupted, and the present processing ends.

Furthermore, after the authentication succeeds in step S221, the registration unit 108 displays, on the display, a guidance screen for writing, into the memory 34 of the IC chip 32 of the identification card 30, the terminal identifiable information of the user terminal 100, herein, the terminal ID assigned by the AP server 10 when the application program 40 is installed in the user terminal 100. The user U brings the identification card 30 close to a predetermined position of the user terminal 100 according to an instruction of the guidance screen. The registration unit 108 writes the terminal ID 46 into the memory 34 (FIG. 11C) of the IC chip 32 by communicating with an NFC communication unit 38 of the identification card 30 (step S225).

In this example, the acquisition unit 102 reads the electronic secret key for signature 52 from the identification card 30 in step S207, but the acquisition unit 102 may read only the face feature value 42 in step S207, and read the electronic secret key for signature 52 from the identification card 30 after the authentication succeeds in step S221 and also store the electronic secret key for signature 52 in the storage unit 120 in step S223.

Then, an execution unit 106 performs processing of giving, by using the public key for challenge 58, an electronic signature 62 to the random number (challenge) 60 transmitted from the AP server 10 in step S203, and transmitting the random number 60 to the AP server 10 (step S227).

When the AP server 10 receives the random number (challenge) 60 provided with the electronic signature 62 from the user terminal 100, the AP server 10 verifies a challenge response (step S229). The public key for challenge 58 stored in the storage apparatus 20 is used for the challenge response verification. The AP server 10 may notify the user terminal 100 of a result of the challenge verification. For example, a fact that the challenge succeeds, a fact that predetermined processing can be performed in the future by performing identity verification by using the identification card 30, and the like may be notified. Alternatively, a fact that the challenge fails and thus the predetermined processing cannot be performed may be notified.

Figure 16:
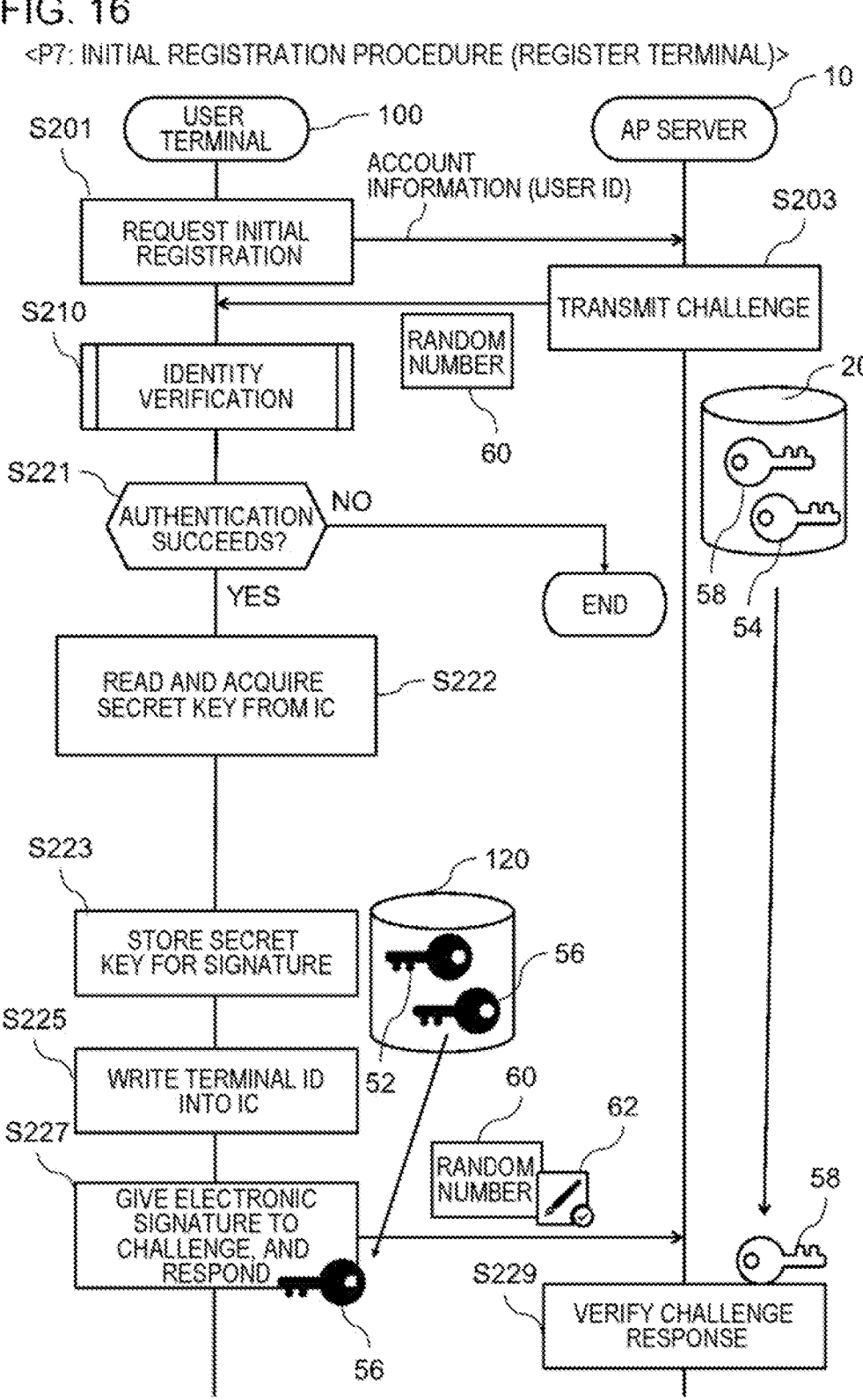
FIG. 16 It is a diagram illustrating another example of a flow of the initial registration procedure.

FIG. 16 is a flowchart illustrating another example of the application initial registration procedure in FIG. 14. In this example, instead of the PIN input in step S205 in FIG. 14, access to the memory 34 of the IC chip 32 of the identification card 30 can be achieved by face authentication. When the initial registration processing starts in step S201 in FIG. 14, the user terminal 100 performs the identity verification processing (step S210) (FIG. 15).

The acquisition unit 102 reads and acquires the face image of the user U being captured by the camera of the user terminal 100 in step S211 in FIG. 15 and the face feature value 42 of the user U being stored in a basic area 35a of the memory 34 of the identification card 30. When the captured face image is collated with the face feature value 42 read from the identification card 30 (step S213 in FIG. 15), and a result of the collation processing indicates that the personal authentication succeeds (YES in step S221), the acquisition unit 102 decrypts a second PIN code encrypted from an expansion area 35b of the memory 34 of the identification card 30, accesses the basic area 35a of the memory 34 of the identification card 30 by using the second PIN code, and reads and acquires the electronic secret key for signature 52 (step S222).

Then, the acquisition unit 102 stores, in the security area 122 (FIG. 12D) of the storage unit 120, the face feature value 42 and the electronic secret key for signature 52 that are acquired from the identification card 30 (step S223). When the personal authentication fails (NO in step S221), the user U is notified that the authentication fails and thus the processing is interrupted, and the present processing ends. Steps in and after step S223 are the same as those in FIG. 14, and thus description will be not included.

Figure 17:
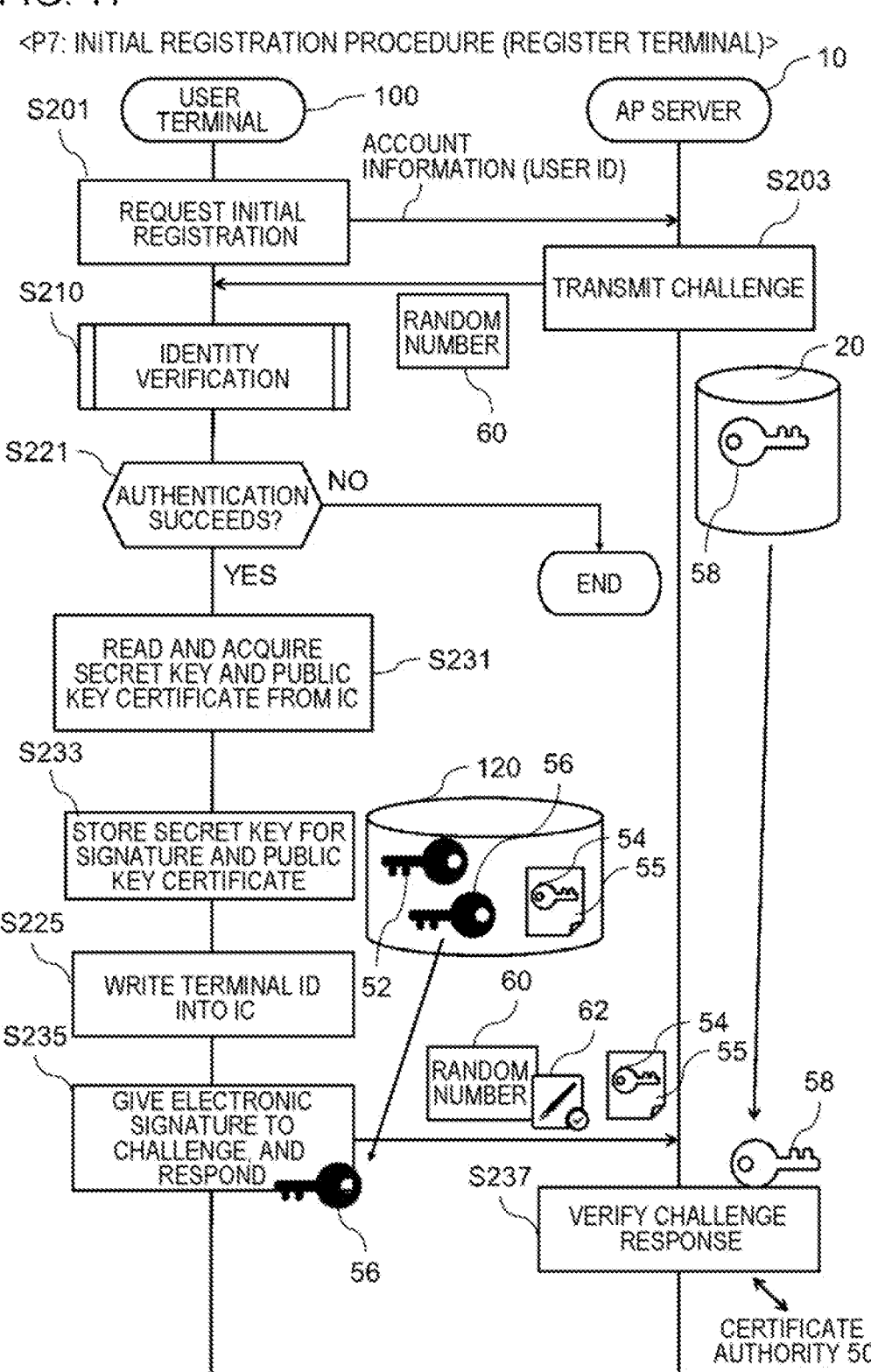
FIG. 17 It is a diagram illustrating a still another example of a flow of the initial registration procedure.

FIG. 17 is a flowchart illustrating still another example of the application initial registration procedure in FIG. 16. This example illustrates an operation when an electronic certificate 55 of the electronic signature public key 54 is stored in the memory 34 of the IC chip 32 of the identification card 30 (FIG. 5B).

Steps up to step S221 are the same as those in FIG. 16. When a result of the collation processing indicates that the personal authentication succeeds in step S221 (YES in step S221), the acquisition unit 102 decrypts a second PIN code encrypted from the expansion area 35b of the memory 34 of the identification card 30, accesses the basic area 35a of the memory 34 of the identification card 30 by using the second PIN code, and reads and acquires the electronic secret key for signature 52, the electronic signature public key 54, and the electronic certificate 55 of the electronic signature public key 54 (step S231).

Then, the acquisition unit 102 stores, in the security area 122 (FIG. 12D) of the storage unit 120, the face feature value 42, the electronic secret key for signature 52, the electronic signature public key 54, and the electronic certificate 55 of the electronic signature public key 54 that are acquired from the identification card 30 (step S233). When the personal authentication fails (NO in step S221), the user U is notified that the authentication fails and thus processing is interrupted, and the present processing ends.

The registration unit 108 writes the terminal ID 46 into the memory 34 (the expansion area 35b in FIG. 5B) of the IC chip 32 by communicating with the NFC communication unit 38 of the identification card 30 (step S225). Then, the execution unit 106 performs processing of giving, by using the public key for challenge 58, the electronic signature 62 to the random number (challenge) 60 transmitted from the AP server 10 in step S203, and transmitting the random number 60 to the AP server 10. At this time, the electronic signature public key 54 and the electronic certificate 55 that are acquired from the identification card 30 in step S231 are also transmitted to the AP server 10 (step S235).

When the AP server 10 receives the random number (challenge) 60 provided with the electronic signature 62 from the user terminal 100, the AP server 10 verifies a challenge response. At this time, the AP server 10 performs verification of the electronic certificate 55 of the electronic signature public key 54 being received from the user terminal 100 by making an inquiry from the certificate authority 50 (step S237).

In the present example embodiment, as a result of authentication by the authentication unit 104 by using a face image (second personal identifiable information) captured by the camera mounted on the user terminal 100 and a face feature value (first personal identifiable information) that is stored in the storage unit 120 of the user terminal 100 and has already been subjected to identity verification, when the authentication succeeds, the registration unit 108 writes the terminal ID 46 (terminal identifiable information) into the IC chip 32 of the identification card 30), and registers the user terminal 100 in the identification card 30.

In this way, according to the present example embodiment, since the terminal ID 46 of the user terminal 100 is stored in the identification card 30, even when the identification card 30 is lost or stolen and the present electronic procedure system 1 is to be used from another terminal, the AP server 10 can detect inconsistency between a terminal ID of the terminal and the terminal ID registered in the identification card 30, and thus unauthorized use can be prevented.

Third Example Embodiment

An information processing apparatus 100 according to the present example embodiment is similar to that in the example embodiments described above except for a point that the information processing apparatus 100 according to the present example embodiment has a configuration for performing identity verification by using an identification card 30 prepared in advance in the second example embodiment described above, and performing predetermined processing. Since a user terminal 100 according to the present example embodiment has the same configuration as that of the information processing apparatus 100 in FIG. 7, description is given by using FIG. 7. However, the configuration of the present example embodiment can be combined as long as the present example embodiment is not inconsistent with at least any one of configurations of other example embodiments.

Figure 18:
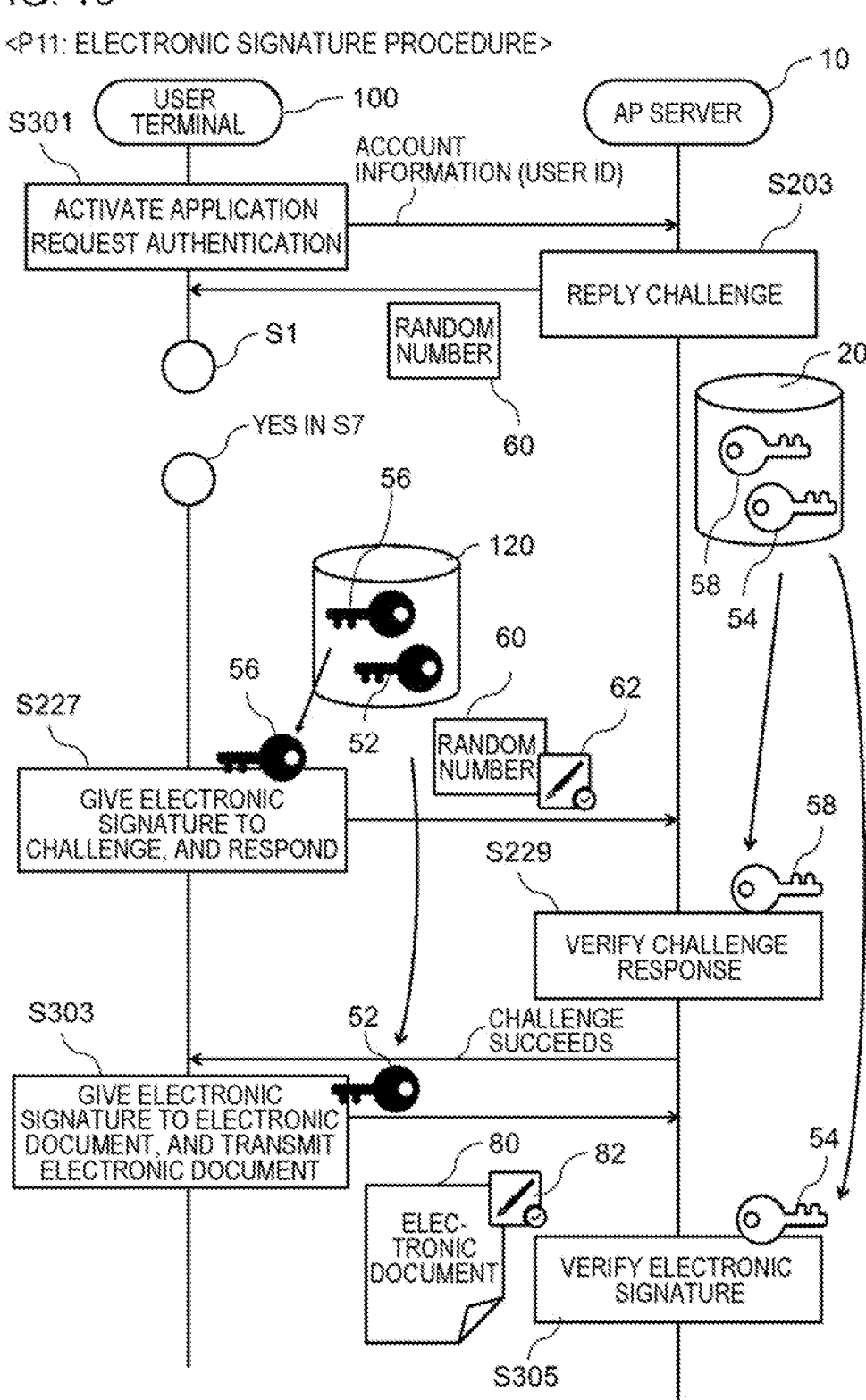
FIG. 18 It is a diagram illustrating a detailed flow of an electronic signature procedure.

<P11: Electronic Signature Procedure>
FIG. 18 is a diagram illustrating a detailed flow of the electronic signature procedure in the procedure P11 in FIG. 8. Herein, processing of giving an electronic signature 82 to an electronic document 80 by using the identification card 30 that has already been subjected to the initial registration in the procedure P7 illustrated in FIG. 14 and the user terminal 100 (the user terminal 100 and the identification card 30 that have already been associated) will be described.

The procedure P11 in FIG. 18 includes the same steps S203, S227, and S229 as those in the procedure P7 in FIG. 14, and also further includes step S301 to step S305. Further, before an electronic signature is provided, identity verification and processing of confirming association between the user terminal 100 and the identification card 30 are performed according to the procedure in FIG. 6.

First, when an application program 40 is activated in the user terminal 100, a login screen is displayed. Account information input to the login screen by a user U is transmitted as an authentication request to an AP server 10 (step S301). Alternatively, when an automatic login is permitted by the user U, account information may be automatically transmitted as an authentication request to the AP server 10 by using the account information stored in advance in a storage unit 120 of the user terminal 100.

The application program 40 may be activated by an operation of the user U, or may be activated from a predetermined Web site after consent is obtained from the user U when the electronic signature 82 is provided to the electronic document 80 to be submitted on the predetermined Web site as described above.

When the AP server 10 receives the account information about the user U, the AP server 10 performs challenge/response authentication on the user terminal 100 (step S203). Specifically, the AP server 10 generates a random number (challenge) 60, and transmits the random number 60 to the user terminal 100.

Before the user terminal 100 responds to the challenge from the AP server 10, the processing proceeds to step S1 in FIG. 6. First, an acquisition unit 102 acquires a face feature value 42 and a terminal ID 46 from an IC chip 32 of the identification card 30 (step S1). Next, the authentication unit 104 activates a camera of the user terminal 100, and also displays a guidance screen for capturing a face image of the user U on a display. The user U performs capturing of a face image by operating according to an instruction of the guidance screen. In this way, the authentication unit 104 acquires the face image of the user U being captured by the camera (step S3). As described above, liveness verification may also be used in order to prevent unauthorized behavior such as spoofing.

For example, the authentication unit 104 collates the face image (face feature value) captured by the user terminal 100 in step S1 with the face feature value 42 read from the IC chip 32 in step S3, and also collates the terminal ID 46 read from the IC chip 32 in step S1 with a terminal ID stored in the storage unit 120 (step S5).

Note that, the identity verification processing using the face image in step S5 can be performed in at least one pattern of the pattern 1 to the pattern 4 described above. When authentication of both of the personal identifiable information and the terminal identifiable information succeeds (YES in step S7), the processing returns to FIG. 18, and an execution unit 106 performs processing of giving, by using a public key for challenge 58, an electronic signature 62 to the random number (challenge) 60 transmitted from the AP server 10 in step S203, and transmitting the random number 60 to the AP server 10 (step S227).

When the AP server 10 receives the random number (challenge) 60 provided with the electronic signature 62 from the user terminal 100, the AP server 10 verifies a challenge response (step S229). The public key for challenge 58 stored in a storage apparatus 20 is used for the challenge response verification.

When the challenge succeeds, the success is transmitted from the AP server 10 to the user terminal 100, and the execution unit 106 reads an electronic secret key for signature 52 from a security area 122 of the storage unit 120, gives the electronic signature 82 to the electronic document 80, and transmits the electronic document 80 to the AP server 10 (step S303). When the AP server 10 receives the electronic document 80 from the user terminal 100, the AP server 10 reads an electronic signature public key 54 (FIG. 10C) being stored in the storage apparatus 20 and associated with the terminal ID of the user U, and verifies the electronic signature 82 (step S305).

A verification result may be transmitted to the user terminal 100, or the electronic document 80 may be transmitted to a predetermined destination when validity of an electronic certificate is confirmed as a result of the verification of the electronic signature 82. When it is confirmed that an electronic certificate is not valid as a result of the verification, the user terminal 100 may be notified that the electronic signature 82 of the electronic document 80 is not valid and thus the electronic document 80 cannot be submitted (transmitted). Furthermore, when it is confirmed that an electronic certificate is not valid, the AP server 10 can also apply invalidation of a pair of the electronic signature public key 54 and the electronic secret key for signature 52 to a certificate authority 50.

Furthermore, when the user U notices that the identification card 30 has been lost or stolen, the user U can also cause the AP server 10 to apply invalidation of a pair of the electronic signature public key 54 and the electronic secret key for signature 52 to the certificate authority 50 by submitting an application (inputting necessary information on a predetermined screen) to the AP server 10 in a predetermined menu of the application program 40.

The present example embodiment can achieve an effect similar to the example embodiments described above. In other words, according to the configuration of the present example embodiment, since certification processing of identity verification is performed by using the identification card 30 and the user terminal 100 that have been associated in advance, unauthorized behavior such as spoofing can be prevented, and the electronic signature 82 can be given to the electronic document 80 by using the electronic secret key for signature 52 read from the identification card 30 by using the user terminal 100 that has been rightfully subjected to the identity verification.

Since the identification card 30 and the user terminal 100 can be associated with each other by storing the terminal ID 46 in advance in the identification card 30, an input of a PIN code is also unnecessary when the user terminal 100 reads information about the identification card 30. In this way, also in the present example embodiment, usability and security of an electronic signature improve.

Fourth Example Embodiment

In the example embodiments described above, an identification card 30 on which an IC chip 32 is mounted is used. In the present example embodiment, a configuration that can give an electronic signature 82 to an electronic document 80 by using the identification card 30 on which the IC chip 32 is not mounted will be described.

In the example embodiments described above, a procedure of storing an electronic certificate in advance in the IC chip 32 of the identification card 30 is performed, but the IC chip 32 is not mounted on the identification card 30 in the present example embodiment, and thus an electronic certificate cannot be stored in advance. Thus, in the present example embodiment, a pair of an electronic signature public key 54 and an electronic secret key for signature 52 is dynamically generated in a user terminal 100 at a time of user registration.

Figure 19:
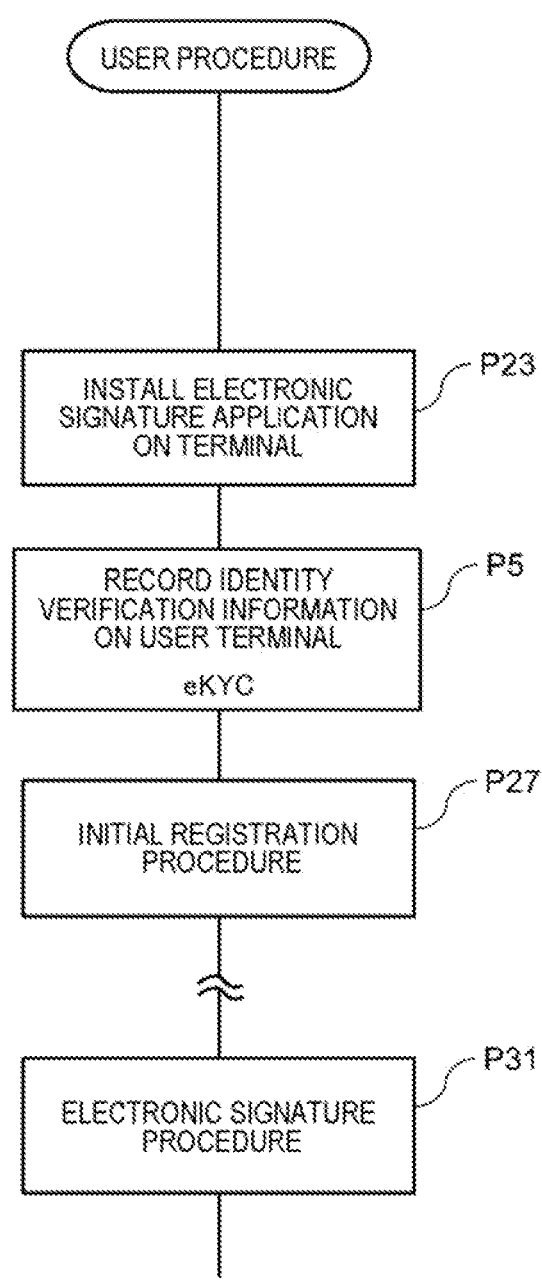
FIG. 19 It is a diagram illustrating one example of a usage flow of an electronic procedure system using an identification card on which an IC chip is not mounted.

FIG. 19 is a diagram illustrating one example of a usage flow of an electronic procedure system 1 using the identification card 30 on which the IC chip 32 is not mounted.

First, an application program 40 of the electronic procedure system 1 is installed in the user terminal 100 (procedure P23). Next, a face image (face feature value) subjected to identity verification by eKYC and the like is stored in a storage unit 120 of the user terminal 100 (procedure P5). The procedure P5 is similar to that in FIG. 8.

Then, an initial registration procedure for using the electronic procedure system 1 is performed via the application 40 (procedure P27). When a preparation up to this point ends, an electronic signature procedure (procedure P31) can be performed, as necessary. Details of each procedure will be described below.

<P23: Installation of Application>

In the procedure P23 in FIG. 19, the application program 40 for using the electronic procedure system 1 is downloaded in the user terminal 100 of a user U. A pair of a common public key for challenge 58 and a common challenge secret key 56 is associated in the application program 40 downloaded in the user terminal 100 of each user U, and identification information about the application program 40 and the public key for challenge 58 are stored in association with each other in the storage apparatus 20 (FIG. 10D).

The downloaded application is installed in the user terminal 100. After the installation, an information processing apparatus 100 displays a user registration screen for use of the electronic procedure system 1 on a display of the user terminal 100. When information needed for user registration is input to the user registration screen, the AP server 10 issues a user ID to the user U, and performs the user registration. The user ID is account information needed for logging in to the electronic procedure system 1 when the electronic procedure system 1 is used. At a time of a login, an input of any password being set by the user U and the user ID is required as the account information about the user U. The password may be able to be appropriately changed by the user U for a security improvement. As illustrated in FIG. 10A, the account information (the user ID and the password) about the user U is stored in a storage apparatus 20.

Furthermore, when the application program 40 is installed in the user terminal 100, the challenge secret key 56 is also downloaded together and stored in the storage unit 120 of the user terminal 100. The challenge secret key 56 may be encoded by a white box code and stored, or may be stored in a security area 122 (FIG. 12A) of the storage unit 120.

<P5: Identity Verification Procedure>

Similarly to the example embodiments described above, and in the procedure P5, the certified face feature value is stored in the security area 122 (FIG. 12C) of the storage unit 120 of the user terminal 100.

<P27: Application Initial Registration Procedure>

Figure 20:
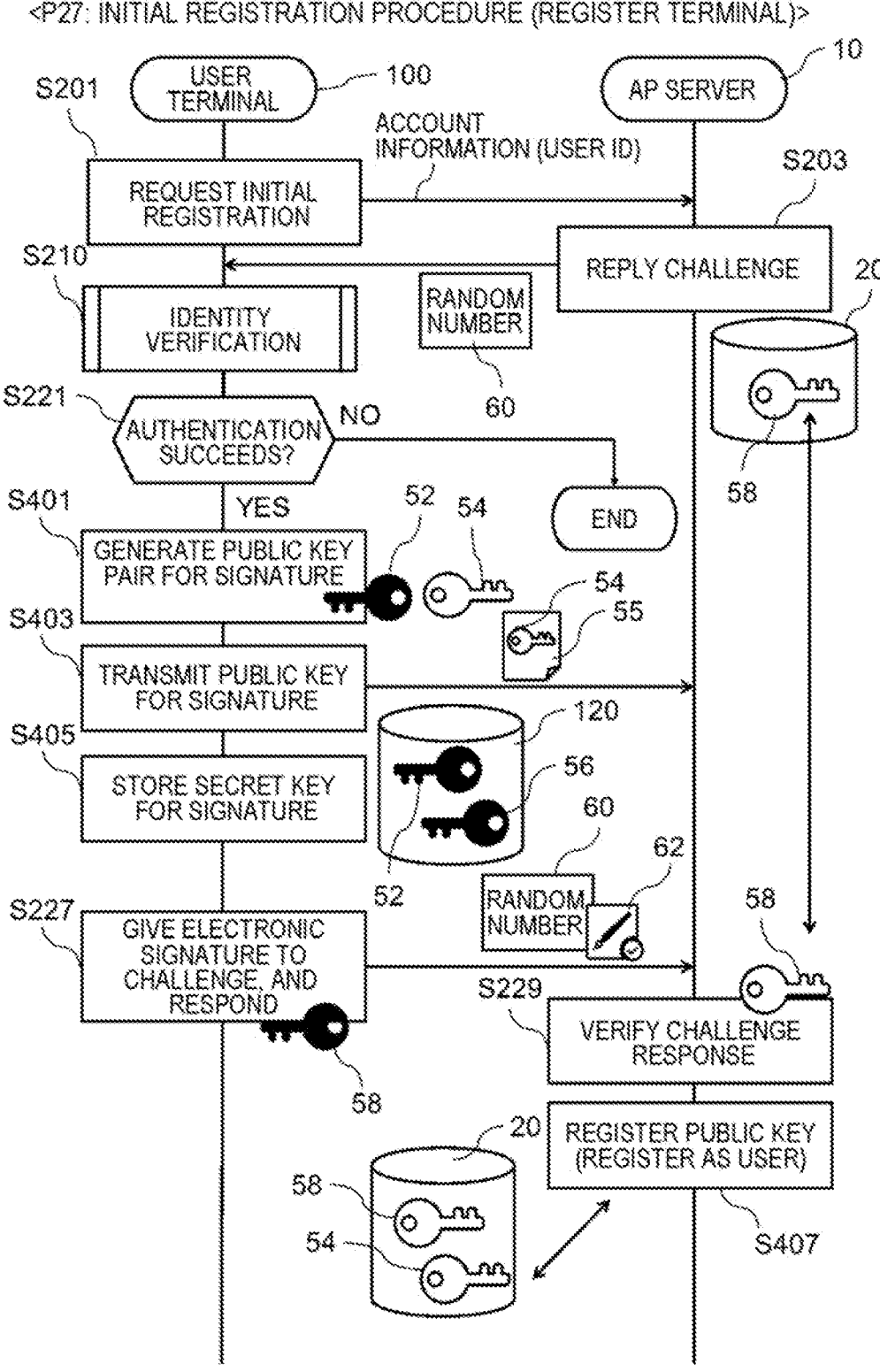
FIG. 20 It is a diagram illustrating a flow of the initial registration procedure.

FIG. 20 is a diagram illustrating a flow for initial setting in a procedure P27 in FIG. 19 being performed when a program is first activated after the application is downloaded in the user terminal 100 of the user U in the procedure P23 in FIG. 19. However, the present processing may also be performed when the application is downloaded, and the program is used and then deleted, and also when the application is downloaded again and activated. Further, the present processing is also performed when the user U changes the user terminal 100 to a different model, and also when the application is downloaded again in a new model and activated.

The flow in FIG. 20 includes the same step S201, step S203, step S210, step S221, step S227, and step S229 as those in the flow in FIG. 14, and also further includes step S401 to step S407.

In the flow, as initial setting for using an application of the electronic procedure system 1, identity verification of the user U and, hereinafter, acquisition of an electronic certificate to be used for an electronic signature are performed. First, when the application is activated in the user terminal 100, an initial registration screen is displayed, and the user U inputs account information and starts initial registration processing (step S201). When the AP server 10 receives the account information about the user U, the AP server 10 performs challenge/response authentication on the user terminal 100 (step S203). Specifically, the AP server 10 generates a random number (challenge) 60, and transmits the random number 60 to the user terminal 100.

Before the user terminal 100 responds to the challenge from the AP server 10, the user terminal 100 performs the identity verification and registration processing of an electronic certificate. First, the user terminal 100 performs identity verification processing (step S210). The identity verification processing in step S210 is the same as the flow in FIG. 15 described above. However, since the IC chip 32 is not mounted on the identification card 30, the collation processing is performed in at least one of the pattern 2 to the pattern 4 other than the pattern 1 using a face feature value 42 from the identification card 30.

When a result of the identity verification processing in step S210 indicates that personal authentication succeeds (YES in step S221), the authentication unit 104 generates a pair of the electronic signature public key 54 and the electronic secret key for signature 52 (step S401). Specifically, a registration unit 108 performs an issuing application of an electronic certificate to any certificate authority (not illustrated) or a certificate authority 50, and acquires the pair of the electronic signature public key 54 and the electronic secret key for signature 52. On the other hand, when the personal authentication fails (NO in step S221), the user U is notified that the authentication fails and thus the processing is interrupted, and the present processing ends.

Then, the registration unit 108 transmits the acquired electronic signature public key 54 and an electronic certificate 55 of the electronic signature public key 54 to the AP server 10 (step S403). Furthermore, the registration unit 108 stores the acquired electronic secret key for signature 52 in the security area 122 (FIG. 12D) of the storage unit 120 (step S405).

Then, an execution unit 106 performs processing of giving, by using the challenge secret key 56, an electronic signature 62 to the random number (challenge) 60 transmitted from the AP server 10 in step S203, and transmitting the random number 60 to the AP server 10 (step S227).

When the AP server 10 receives the random number (challenge) 60 provided with the electronic signature 62 from the user terminal 100, the AP server 10 verifies a challenge response (step S229). The public key for challenge 58 stored in the storage apparatus 20 is used for the challenge response verification. The AP server 10 may notify the user terminal 100 of a result of the challenge verification. For example, a fact that the challenge succeeds, a fact that predetermined processing can be performed in the future by performing identity verification, and the like may be notified. Alternatively, a fact that the challenge fails and thus the predetermined processing cannot be performed may be notified.

Furthermore, when the challenge succeeds, the AP server 10 stores, in the storage apparatus 20 (FIG. 10E), the electronic signature public key 54 received from the user terminal 100 in association with the user ID (step S407). However, the electronic signature public key 54 may not be stored in the storage apparatus 20. In that case, similarly to the example described in FIG. 17, the AP server 10 may make an inquiry, from the certificate authority 50, about verification of the electronic certificate 55 of the electronic signature public key 54 to be transmitted from the user terminal 100.

After the advance preparation ends in such a manner, the electronic signature procedure can be performed in the procedure P31. The procedure P31 can be performed by the same flow as that in FIG. 18 in the example embodiment described above. Hereinafter, description is given by using FIG. 18.

First, when the application program 40 is activated in the user terminal 100, a login screen is displayed. Account information input to the login screen by the user U is transmitted as an authentication request to the AP server 10 (step S301). Alternatively, when an automatic login is permitted by the user U, account information may be automatically transmitted as an authentication request to the AP server 10 by using the account information stored in advance in the storage unit 120 of the user terminal 100.

When the AP server 10 receives the account information about the user U, the AP server 10 performs challenge/response authentication on the user terminal 100 (step S203). Specifically, the AP server 10 generates the random number (challenge) 60, and transmits the random number 60 to the user terminal 100.

Figure 21:
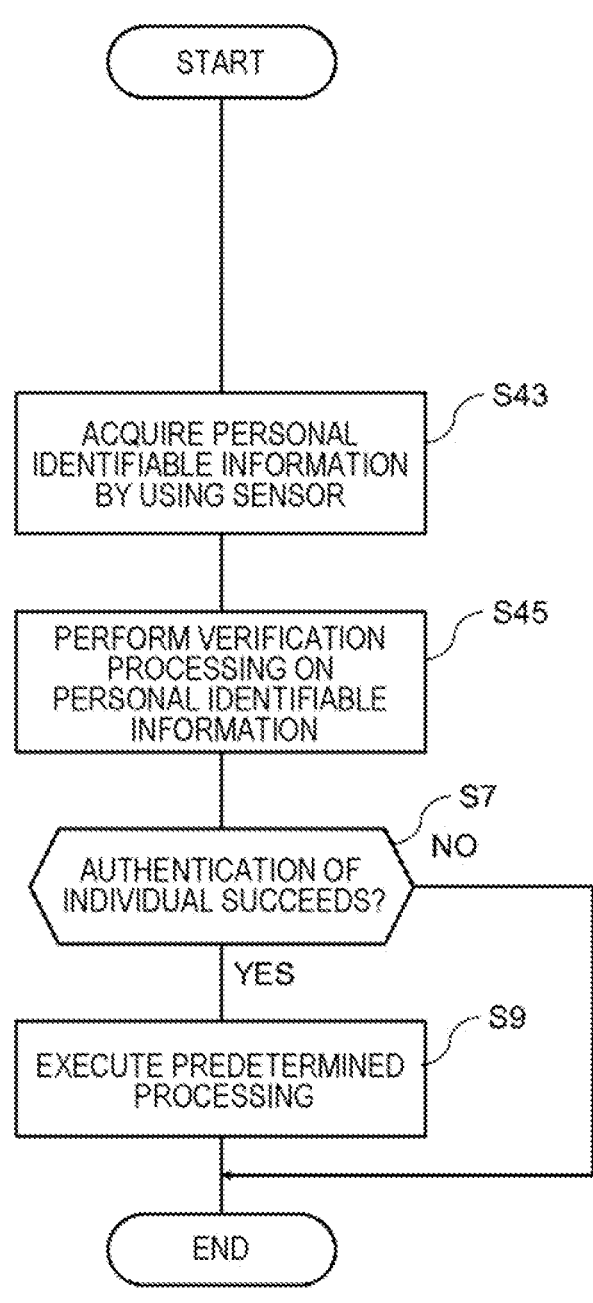
FIG. 21 It is a flowchart illustrating an operation example of the information processing apparatus according to the present example embodiment.

Before the user terminal 100 responds to the challenge from the AP server 10, the processing proceeds to step S43 in FIG. 21. FIG. 21 is a flowchart illustrating an operation example of the information processing apparatus 100 according to the present example embodiment. The flow in FIG. 21 includes step S7 and step S9 similar to those in FIG. 6, and also further includes step S43 and step S45.

First, the authentication unit 104 activates a camera of the user terminal 100, and also displays a guidance screen for capturing a face image of the user U on the display. The user U performs capturing of a face image and a face picture on the front of the identification card 30 by operating according to an instruction of the guidance screen. In this way, the authentication unit 104 acquires the face image of the user U and the face picture on the front of the identification card 30 being captured by the camera (step S43). As described above, liveness verification may also be used in order to prevent unauthorized behavior such as spoofing.

The authentication unit 104 collates a face feature value extracted from the face image of the user U captured in step S43 with a face feature value extracted from the face picture on the front of the identification card 30 (step S45). This is the pattern 3 of the identity verification processing described above, but the collation processing may be performed in at least one pattern of the patterns 2 to 4 other than the pattern 1.

When authentication of the personal identifiable information succeeds (YES in step S7), the processing returns to FIG. 18, and the execution unit 106 performs processing of giving, by using the public key for challenge 58, the electronic signature 62 to the random number (challenge) 60 transmitted from the AP server 10 in step S203, and transmitting the random number 60 to the AP server 10 (step S227).

When the AP server 10 receives the random number (challenge) 60 provided with the electronic signature 62 from the user terminal 100, the AP server 10 verifies a challenge response (step S229). The public key for challenge 58 stored in the storage apparatus 20 is used for the challenge response verification.

When the challenge succeeds, the success is transmitted from the AP server 10 to the user terminal 100, and the execution unit 106 reads the electronic secret key for signature 52 from the security area 122 of the storage unit 120, gives the electronic signature 82 to the electronic document 80, and transmits the electronic document 80 to the AP server 10 (step S303). When the AP server 10 receives the electronic document 80 from the user terminal 100, the AP server 10 reads the electronic signature public key 54 (FIG. 10C) being stored in the storage apparatus 20 and associated with the terminal ID of the user U, and verifies the electronic signature 82 (step S305).

A verification result may be transmitted to the user terminal 100, or the electronic document 80 may be transmitted to a predetermined destination when validity of an electronic certificate is confirmed as a result of the verification of the electronic signature 82. When it is confirmed that an electronic certificate is not valid as a result of the verification, the user terminal 100 may be notified that the electronic signature 82 of the electronic document 80 is not valid and thus the electronic document 80 cannot be submitted (transmitted). Furthermore, when it is confirmed that an electronic certificate is not valid, invalidation of a pair of the electronic signature public key 54 and the electronic secret key for signature 52 can also be applied to the certificate authority 50.

According to the present example embodiment, unauthorized behavior such as spoofing can be prevented by performing certification processing of identity verification by using the identification card 30 on which the IC chip 32 is not mounted, and predetermined processing that requires the identity verification can be rightfully performed. Then, predetermined processing of giving the electronic signature 82 to the electronic document 80, or the like can be performed just by performing identity verification by the user terminal 100 without performing a complicated operation. Thus, usability and security of an electronic signature improve.

While the example embodiments of the present invention have been described with reference to the drawings, the example embodiments are only exemplification of the present invention, and various configurations other than the above-described example embodiments can also be employed.

For example, in the example embodiments described above, the configuration for achieving the information processing apparatus 100 by installing the application program 40 in the user terminal 100 is described. However, in another form, the application program 40 may be executed in a server on a cloud or on software as a service (SaaS), and the user terminal 100 may function as an operation terminal of the server. However, the example embodiments described above in which identity verification is performed on the user terminal 100 have an advantage that a risk of leak of personal information can be further reduced. Thus, a part of the function (except for identity verification and the like) of the information processing apparatus 100 may be executed in a sever.

In the example embodiments described above, the example of performing processing of giving an electronic signature to an electronic document as predetermined processing is described. In another example, processing of receiving various services by the user U by using identity verification information stored in the identification card 30, for example, user authentication processing at a time of a login to a portal site for receiving, by the user U, various services related to a national identification number and the like without accompanying an electronic document can be performed as the predetermined processing.

The same pair of a secret key and a public key as a pair of an electronic secret key for signature and an electronic signature public key may be used, but processing of an electronic signature and the other processing are different in law as a target and the like, and thus a pair of a secret key and a public key different from a pair of an electronic secret key for signature and an electronic signature public key is preferably used. Hereinafter, a user authentication secret key 92, a user authentication public key 94, and an electronic certificate 95 of the user authentication public key 94 are referred.

Figure 22:
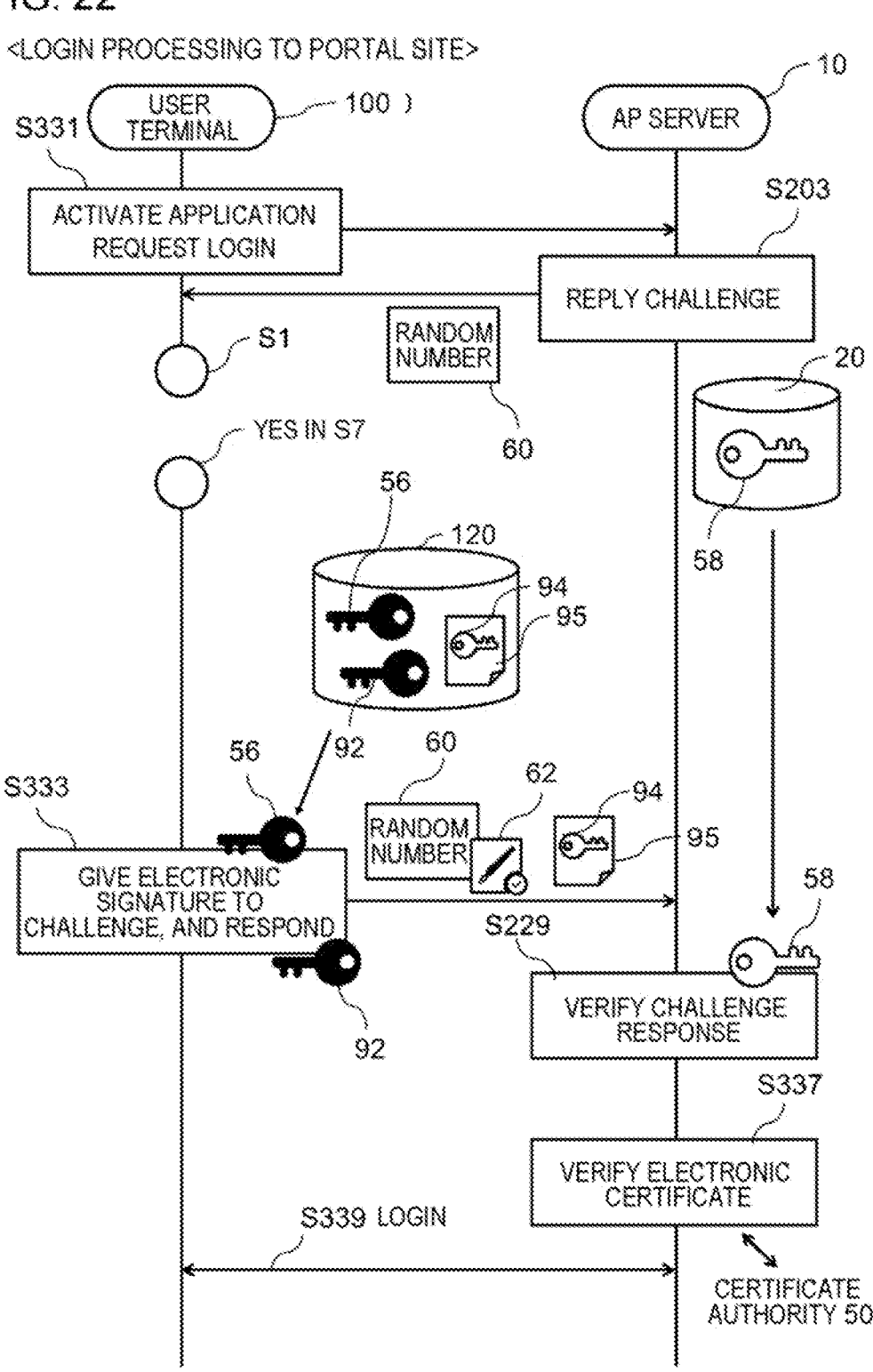
FIG. 22 It is a diagram illustrating a detailed flow of login processing to a portal site.

FIG. 22 is a flowchart illustrating an operation example when login processing to a portal site is performed instead of the electronic signature procedure in the procedure P11 in FIG. 8.

First, when the application program 40 is activated in the user terminal 100, a menu screen is displayed. When a login to a portal site is selected by the user U on the menu screen, a login request is transmitted to the AP server 10 (step S331).

The application program 40 may be activated by an operation by the user U, or the application program 40 may be activated by accessing a predetermined portal site on a browser, and then receiving a press of a login request button to the portal site.

When the AP server 10 receives the login request, the AP server 10 performs challenge/response authentication on the user terminal 100 (step S203). Specifically, the AP server 10 generates the random number (challenge) 60, and transmits the random number 60 to the user terminal 100.

Before the user terminal 100 responds to the challenge from the AP server 10, the processing proceeds to step S1 in FIG. 6. The identity verification processing in step S1 the same as the content described above, and thus description will be not included.

When authentication of both of the personal identifiable information and the terminal identifiable information succeeds (YES in step S7 in FIG. 7), the execution unit 106 performs processing of giving, by using the public key for challenge 58, the electronic signature 62 to the random number (challenge) 60 transmitted from the AP server 10 in step S203, and transmitting the random number 60 to the AP server 10 (step S333). At this time, the user authentication public key 94 and the electronic certificate 95 of the user authentication public key 94 that are stored in the storage unit 120 in the procedure P1 are also transmitted to the AP server 10.

When the AP server 10 receives the random number (challenge) 60 provided with the electronic signature 62 from the user terminal 100, the AP server 10 verifies a challenge response (step S229). The public key for challenge 58 stored in the storage apparatus 20 is used for the challenge response verification.

When the challenge succeeds, verification of the electronic certificate 95 of the user authentication public key 94 being received is further performed by making an inquiry from the certificate authority 50 (step S337). When the verification succeeds, the login processing to the portal site is performed (step S339). A user ID used when a login is performed may be, for example, an issuing number of the electronic certificate 95. In this way, the user U can perform a login without inputting a login ID or a password at a time of login processing.

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information about a user (user U) is acquired and used in the present invention, this is lawfully performed.

A part or the whole of the above-described example embodiment may also be described in supplementary notes below, which is not limited thereto.

1. A program for causing a computer that configures a terminal to implement:

an acquisition unit that acquires first personal identifiable information and terminal identifiable information from a storage medium of a portable type that stores the first personal identifiable information and the terminal identifiable information;

an authentication unit that authenticates second personal identifiable information acquired by a sensor mounted on the terminal and the terminal identifiable information of the terminal by using the first personal identifiable information and the terminal identifiable information acquired from the storage medium; and an execution nit that executes predetermined processing when the authentication succeeds.

2. The program according to supplementary note 1, wherein the predetermined processing includes transmission processing of data provided with an electronic signature.

3. The program according to supplementary note 1 or 2, further causing a computer to implement a registration unit that stores the terminal identifiable information in the storage medium when the authentication of the second personal identifiable information by the authentication unit by using the first personal identifiable information succeeds.

4. An information processing apparatus including:

an acquisition unit that acquires first personal identifiable information and terminal identifiable information from a storage medium of a portable type that stores the first personal identifiable information and the terminal identifiable information;

an authentication unit that authenticating second personal identifiable information acquired by a sensor mounted on a terminal and the terminal identifiable information of the terminal by using the first personal identifiable information and the terminal identifiable information being acquired from the storage medium; and an execution unit that executes predetermined processing when the authentication succeeds.

5. The information processing apparatus according to supplementary note 4, wherein 27 28 the predetermined processing includes transmission processing of data provided with an electronic signature.

6. The information processing apparatus according to supplementary note 4 or 5, further including a registration unit that stores the terminal identifiable information in the storage medium when the authentication of the second personal identifiable information by the authentication unit by using the first personal identifiable information succeeds.

7. An information processing method including, by an information processing apparatus:

acquiring first personal identifiable information and terminal identifiable information from a storage medium of a portable type that stores the first personal identifiable information and the terminal identifiable information;

authenticating second personal identifiable information acquired by a sensor mounted on a terminal and the terminal identifiable information of the terminal by using the first personal identifiable information and the terminal identifiable information being acquired from the storage medium; and executing predetermined processing when the authentication succeeds.

8. The information processing method according to supplementary note 7, wherein the predetermined processing includes transmission processing of data provided with an electronic signature.

9. The information processing method according to supplementary note 7 or 8, further including, by the information processing apparatus, storing the terminal identifiable information in the storage medium when the authentication of the second personal identifiable information by the authentication unit by using the first personal identifiable information succeeds.

REFERENCE SIGNS LIST

1 Electronic procedure system
3 Communication network
10 AP server
20 Storage apparatus
30 Identification card
30a National identification number card
32 IC chip
34 Memory
36 Processor
38 NFC communication unit
40 Application program
42 Face feature value
44 PIN code
46 Terminal ID
50 Certificate authority
52 Electronic secret key for signature
54 Electronic signature public key
56 Challenge secret key
58 Public key for challenge
62 Electronic signature
80 Electronic document
82 Electronic signature
100 Information processing apparatus, user terminal
102 Acquisition unit
104 Authentication unit
106 Execution unit 108 Registration unit
120 Storage unit
122 Security area
1000 Computer
1010 Bus
1020 Processor
1030 Memory
1040 Storage device
1050 Input/output interface
1060 Network interface

What is claimed is:

1. A non-transitory computer-readable storage medium storing a program configured to cause a computer to configure a terminal, the terminal being possessed by a user and comprising a sensor and a memory storing terminal identifiable information, to execute procedures comprising:

acquiring, from a storage medium of a portable type, first personal identifiable information associated with the user and the terminal identifiable information, both of which are recorded on the storage medium;

performing authentication processing of identity verification of the user by:

collating the first personal identifiable information acquired from the storage medium with second personal identifiable information of the user acquired by the sensor of the terminal; and collating the terminal identifiable information acquired from the storage medium with the terminal identifiable information stored in the memory of the terminal; and executing predetermined processing when the authentication succeeds.

2. The non-transitory computer-readable storage medium according to claim 1, wherein the predetermined processing comprises transmission processing of data provided with an electronic signature subjected to identity verification.

3. The non-transitory computer-readable storage medium according to claim 2, wherein the procedures further comprise:

in a case where the authentication processing of identity verification of the user succeeds, reading an electronic secret key for signature from the memory of the terminal, to preform, as the predetermined processing, a transmission processing of data provided with the electronic signature by using an electronic secret key for signature.

4. The non-transitory computer-readable storage medium according to claim 1, wherein the procedures further comprise:

authenticating the second personal identifiable information by using the first personal identifiable information; and storing the terminal identifiable information which is stored in the memory of the terminal in the storage medium, wherein the storage medium comprises an identification card of the user and does not record thereon the terminal identifiable information when the authentication of the second personal identifiable information by using the first personal identifiable information succeeds.

5. The non-transitory computer-readable storage medium according to claim 4, wherein the procedures further comprise:

in a case where the authentication processing of identity verification of the user succeeds, reading an electronic secret key for signature from the memory of the terminal, to cause the electronic secret key for signature to be stored in the memory of the terminal.

6. An information processing apparatus configured to configure a terminal being possessed by a user and comprising a sensor and a memory storing terminal identifiable information, the information processing apparatus comprising:

at least one memory configured to store instructions; and at least one processor configured to execute the instructions to:

acquire, from a storage medium of a portable type, first personal identifiable information associated with the user and the terminal identifiable information, both of which are recorded on the storage medium;

authenticate:

second personal identifiable information of the user and acquired by the sensor of the terminal by collating the first personal identifiable information acquired from the storage medium with the second personal identifiable information; and terminal identifiable information stored in the memory of the terminal by collating the terminal identifiable information acquired from the storage medium with the terminal identifiable information stored in the memory of the terminal; and execute predetermined processing when the authentication succeeds.

7. The information processing apparatus according to claim 6, wherein the predetermined processing comprises transmission processing of data provided with an electronic signature subjected to identity verification.

8. The information processing apparatus according to claim 7, wherein the at least one processor is further configured to execute the instructions to:

in a case where the authentication processing of identity verification of the user succeeds, reading an electronic secret key for signature from the memory of the terminal, to preform, as the predetermined processing, a transmission processing of data provided with the electronic signature by using an electronic secret key for signature.

9. The information processing apparatus according to claim 7, wherein the at least one processor is further configured to execute the instructions to:

in a case where the authentication processing of identity verification of the user succeeds, reading an electronic secret key for signature from the memory of the terminal, to cause the electronic secret key for signature to be stored in the memory of the terminal.

10. The information processing apparatus according to claim 6, wherein the at least one processor is further configured to execute the instructions to:

authenticate the second personal identifiable information by using the first personal identifiable information; and store the terminal identifiable information which is stored in the memory of the terminal in the storage medium, wherein the storage medium comprises an identification card of the user and does not record thereon the terminal identifiable information when the authentication of the second personal identifiable information by using the first personal identifiable information succeeds.

11. An information processing method comprising, configuring, using an information processing apparatus, a terminal being possessed by a user and comprising a sensor and a memory storing terminal identifiable information to execute procedures comprising:

acquiring, from a storage medium of a portable type, first personal identifiable information associated with the user and the terminal identifiable information, both of which are recorded on the storage medium;

authenticating:

second personal identifiable information of the user and acquired by the sensor of the terminal by collating the first personal identifiable information acquired from the storage medium with the second personal identifiable information; and terminal identifiable information stored in the memory of the terminal by collating the terminal identifiable information acquired from the storage medium with the terminal identifiable information stored in the memory of the terminal; and executing predetermined processing when the authentication succeeds.

12. The information processing method according to claim 11, wherein the predetermined processing comprises transmission processing of data provided with an electronic signature subjected to identity verification.

13. The information processing method according to claim 12, wherein the procedures further comprise:

in a case where the authentication processing of identity verification of the user succeeds, reading an electronic secret key for signature from the memory of the terminal, to preform, as the predetermined processing, a transmission processing of data provided with the electronic signature by using an electronic secret key for signature.

14. The information processing method according to claim 11, wherein the procedures further comprise:

using the information processing apparatus, authenticating the second personal identifiable information by using the first personal identifiable information; and storing the terminal identifiable information which is stored in the memory of the terminal in the storage medium wherein the storage medium comprises an identification card of the user and does not record thereon the terminal identifiable information when the authentication of the second personal identifiable information by using the first personal identifiable information succeeds.

15. The information processing method according to claim 14, wherein the procedures further comprise:

in a case where the authentication processing of identity verification of the user succeeds, reading an electronic secret key for signature from the memory of the terminal, to cause the electronic secret key for signature to be stored in the memory of the terminal.

* * * * *